(12) United States Patent
Mutchler et al.

(10) Patent No.: US 12,195,562 B2
(45) Date of Patent: Jan. 14, 2025

(54) ETHYLENE POLYMERIZATION PROCESSES AND REACTOR SYSTEMS FOR THE PRODUCTION OF MULTIMODAL POLYMERS USING COMBINATIONS OF A LOOP REACTOR AND A FLUIDIZED BED REACTOR

(71) Applicant: Chevron Phillips Chemical Company LP, The Woodlands, TX (US)

(72) Inventors: Joel A. Mutchler, Porter, TX (US); Eric J. Netemeyer, Kingwood, TX (US); Joseph A. Curren, Houston, TX (US); Michael H. Treptau, Kingwood, TX (US); Kenneth A. Dooley, Porter, TX (US); Jeffrey S. Lowell, Conroe, TX (US); Jeffrey S. Fodor, Bartlesville, OK (US); Scott E. Kufeld, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 18/499,276

(22) Filed: Nov. 1, 2023

(65) Prior Publication Data
US 2024/0059808 A1    Feb. 22, 2024

Related U.S. Application Data

(63) Continuation of application No. 17/589,981, filed on Feb. 1, 2022, now Pat. No. 11,845,814.

(51) Int. Cl.
*C08F 10/02*    (2006.01)
*B01J 8/24*    (2006.01)
*B01J 19/18*    (2006.01)
*C08F 2/00*    (2006.01)
*C08F 2/01*    (2006.01)
*C08L 23/04*    (2006.01)

(52) U.S. Cl.
CPC .............. *C08F 10/02* (2013.01); *B01J 8/24* (2013.01); *B01J 19/1837* (2013.01); *C08F 2/001* (2013.01); *C08F 2/01* (2013.01); *C08L 23/04* (2013.01); *B01J 2208/00769* (2013.01); *C08L 2207/062* (2013.01); *C08L 2207/066* (2013.01); *C08L 2314/02* (2013.01)

(58) Field of Classification Search
USPC .......................................................... 526/65
See application file for complete search history.

(56) References Cited

U.S. PATENT DOCUMENTS

| | | | |
|---|---|---|---|
| 5,326,835 A * | 7/1994 | Ahvenainen | B01J 19/2435 526/348.4 |
| 10,029,230 B1 * | 7/2018 | Kufeld | C08F 10/00 |
| 2014/0329977 A1 * | 11/2014 | Hottovy | C08F 2/01 526/64 |

FOREIGN PATENT DOCUMENTS

EP    3160638 B1 *    3/2019    ........... B01J 19/24

\* cited by examiner

*Primary Examiner* — Fred M Teskin
(74) *Attorney, Agent, or Firm* — Merchant & Gould P.C.

(57) ABSTRACT

Polymerization processes and reactor systems for producing multimodal ethylene polymers are disclosed in which at least one loop reactor and at least one fluidized bed reactor are utilized. Configurations include a loop reactor in series with a fluidized bed reactor and two loop reactors in series with a fluidized bed reactor.

21 Claims, 6 Drawing Sheets

ETHYLENE POLYMERIZATION PROCESSES AND REACTOR SYSTEMS FOR THE PRODUCTION OF MULTIMODAL POLYMERS USING COMBINATIONS OF A LOOP REACTOR AND A FLUIDIZED BED REACTOR

REFERENCE TO RELATED APPLICATIONS

This application is a continuation application of co-pending U.S. patent application Ser. No. 17/589,981, filed on Feb. 1, 2022, now U.S. Pat. No. 11,845,814, and this application also is related to U.S. patent application Ser. No. 17/724,643, filed on Apr. 20, 2022, now U.S. Pat. No. 11,466,104, and U.S. patent application Ser. No. 17/934,609, filed on Sep. 23, 2022, now U.S. Pat. No. 11,767,378, the disclosures of which are incorporated herein by reference in their entirety.

FIELD OF THE INVENTION

The present disclosure relates to methods and reactor systems for producing multimodal ethylene polymers, and more particularly, relates to such methods and systems in which a loop reactor and a fluidized bed reactor, configured in series or in parallel, are utilized to produce the multimodal ethylene polymers.

BACKGROUND OF THE INVENTION

Ethylene-based polymers such as high density polyethylene (HDPE) homopolymer and copolymer and linear low density polyethylene (LLDPE) copolymer can be produced using various combinations of catalyst systems and polymerization reactors. There is an on-going need for polymerization processes and reactor systems that can produce polymers having multimodal molecular weight distributions that are suitable for use in film, pipe, blow molding, and other end-use applications. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Processes and reactor systems for producing a multimodal ethylene polymer are described herein. A first process for producing a multimodal ethylene polymer can comprise (i) contacting a catalyst composition with ethylene, an optional first olefin comonomer, and hydrogen in an inert hydrocarbon diluent in a loop reactor under slurry or supercritical polymerization conditions to produce a first ethylene polymer, (ii) discharging a first reactor effluent containing the first ethylene polymer from the loop reactor, (iii) separating a light fraction comprising hydrogen from the first reactor effluent to form an intermediate material, and (iv) contacting the intermediate material with ethylene and an optional second olefin comonomer in an inert gas and/or hydrocarbon in a fluidized bed reactor under gas phase polymerization conditions to produce the multimodal ethylene polymer.

A second process for producing a multimodal ethylene polymer can comprise (i) contacting a catalyst composition with ethylene, an optional first olefin comonomer, and optional hydrogen in an inert hydrocarbon diluent in a first loop reactor under slurry or supercritical polymerization conditions to produce a first ethylene polymer, (ii) discharging a first reactor effluent containing the first ethylene polymer from the first loop reactor and introducing the first reactor effluent into a second loop reactor, (iii) contacting the first reactor effluent with ethylene, an optional second olefin comonomer, and optional hydrogen in the second loop reactor under slurry or supercritical polymerization conditions to produce a second ethylene polymer, (iv) discharging a second reactor effluent containing the second ethylene polymer from the second loop reactor, (v) separating a light fraction comprising hydrogen from the second reactor effluent to form an intermediate material, wherein hydrogen is present in step (i), or step (iii), or both, and (vi) contacting the intermediate material with ethylene and an optional third olefin comonomer in an inert gas and/or hydrocarbon in a fluidized bed reactor under gas phase polymerization conditions to produce the multimodal ethylene polymer.

A third process for producing a multimodal ethylene polymer can comprise (i) contacting a catalyst composition with ethylene and an optional first olefin comonomer in an inert gas and/or hydrocarbon in a fluidized bed reactor under gas phase polymerization conditions to produce a first ethylene polymer, (ii) discharging a first reactor effluent containing the first ethylene polymer from the fluidized bed reactor, (iii) combining an inert hydrocarbon diluent with the first reactor effluent and increasing the pressure to form an intermediate material, and (iv) contacting the intermediate material with ethylene and an optional second olefin comonomer in a loop reactor under slurry or supercritical polymerization conditions to produce the multimodal ethylene polymer.

A fourth process for producing a multimodal ethylene polymer can comprise (i) contacting a first catalyst composition with ethylene and an optional first olefin comonomer in an inert hydrocarbon diluent in a loop reactor under slurry or supercritical polymerization conditions to produce a first ethylene polymer, (ii) contacting a second catalyst composition with ethylene and an optional second olefin comonomer in an inert gas and/or hydrocarbon in a fluidized bed reactor under gas phase polymerization conditions to produce a second ethylene polymer, and (iii) combining the first ethylene polymer and the second ethylene polymer to produce the multimodal ethylene polymer.

Referring now to reactor systems consistent with the present invention, a first polymerization reactor system for producing a multimodal ethylene polymer can comprise (a) a loop reactor configured to contact a catalyst composition with ethylene, an optional first olefin comonomer, and hydrogen in an inert hydrocarbon diluent under slurry or supercritical polymerization conditions to produce a first ethylene polymer, (b) a discharge line configured to withdraw a first reactor effluent containing the first ethylene polymer from the loop reactor, (c) a separator configured to remove a light fraction comprising hydrogen from the first reactor effluent to form an intermediate material, and (d) a fluidized bed reactor configured to contact the intermediate material with ethylene and an optional second olefin comonomer in an inert gas and/or hydrocarbon under gas phase polymerization conditions to produce the multimodal ethylene polymer.

A second polymerization reactor system for producing a multimodal ethylene polymer can comprise (a) a first loop reactor configured to contact a catalyst composition with ethylene, an optional first olefin comonomer, and optional hydrogen in an inert hydrocarbon diluent under slurry or supercritical polymerization conditions to produce a first ethylene polymer, (b) a second loop reactor configured to contact a first reactor effluent containing the first ethylene polymer with ethylene, an optional second olefin comonomer, and optional hydrogen under slurry or supercritical polymerization conditions to produce a second ethylene polymer, (c) a transfer line configured to withdraw the first reactor effluent containing the first ethylene polymer from the first loop reactor and to introduce the first reactor effluent into the second loop reactor, (d) a second discharge line configured to withdraw a second reactor effluent containing the second ethylene polymer from the second loop reactor, (e) a separator configured to remove a light fraction comprising hydrogen from the second reactor effluent to form an intermediate material, wherein hydrogen is present in the first loop reactor, the second loop reactor, or both, and (f) a fluidized bed reactor configured to contact the intermediate material with ethylene and an optional third olefin comonomer in an inert gas and/or hydrocarbon under gas phase polymerization conditions to produce the multimodal ethylene polymer.

A third polymerization reactor system for producing a multimodal ethylene polymer can comprise (a) a fluidized bed reactor configured to contact a catalyst composition with ethylene and an optional first olefin comonomer in an inert gas and/or hydrocarbon under gas phase polymerization conditions to produce a first ethylene polymer, (b) a discharge line configured to withdraw a first reactor effluent containing the first ethylene polymer from the fluidized bed reactor, (c) a transfer line configured to combine an inert hydrocarbon diluent with the first reactor effluent and to increase pressure to form an intermediate material, and (d) a loop reactor configured to contact the intermediate material with ethylene and an optional second olefin comonomer under slurry or supercritical polymerization conditions to produce the multimodal ethylene polymer.

A fourth polymerization reactor system for producing a multimodal ethylene polymer can comprise (a) a loop reactor configured to contact a catalyst composition with ethylene and an optional first olefin comonomer in an inert hydrocarbon diluent under slurry or supercritical polymerization conditions to produce a first ethylene polymer, (b) a fluidized bed reactor configured to contact a second catalyst composition with ethylene and an optional second olefin comonomer in an inert gas and/or hydrocarbon under gas phase polymerization conditions to produce a second ethylene polymer, and (c) a mixing device configured to combine the first ethylene polymer and the second ethylene polymer to produce the multimodal ethylene polymer.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURES

The following figures form part of the present specification and are included to further demonstrate certain aspects of the present invention. The invention may be better understood by reference to one or more of these figures in combination with the detailed description and examples.

Figure 1:
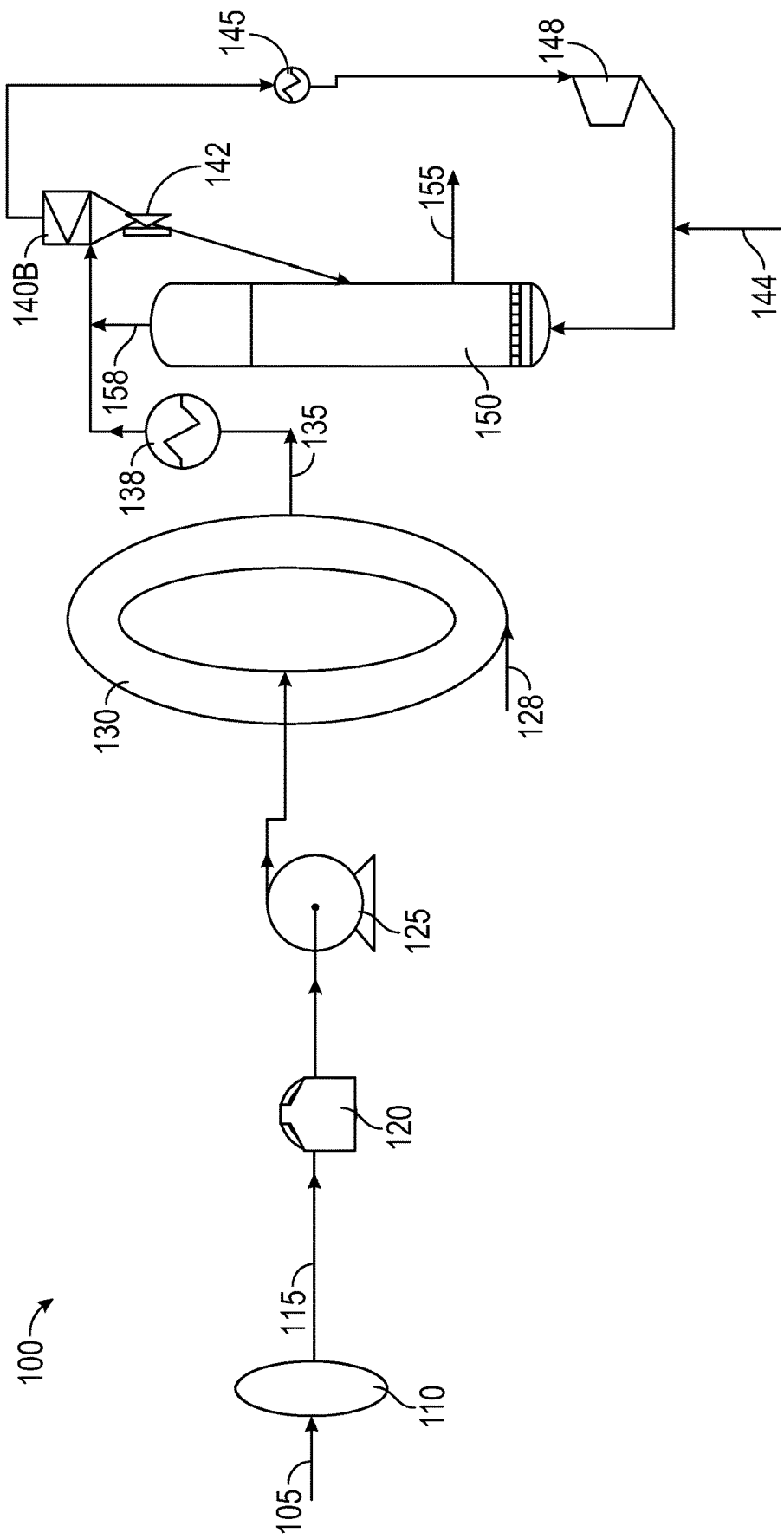
FIG. 1 illustrates a polymerization reactor system consistent with an aspect of the present invention.

While the inventions disclosed herein are susceptible to various modifications and alternative forms, only a few specific aspects have been shown by way of example in the drawings and described in detail below. The figures and detailed descriptions of these specific aspects are not intended to limit the breadth or scope of the inventive concepts or the appended claims in any manner. Rather, the figures and detailed descriptions are provided to illustrate the inventive concepts to a person of ordinary skill in the art and to enable such person to make and use the inventive concepts.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the systems, compositions, processes, or methods described herein are contemplated with or without explicit description of the particular combination. Additionally, unless explicitly recited otherwise, any aspect or feature disclosed herein can be combined to describe inventive systems, compositions, processes, or methods consistent with the present disclosure.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "hydrocarbon" whenever used in this specification and claims refers to a compound containing only carbon and hydrogen, whether saturated or unsaturated.

Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon).

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

Unless otherwise specified, the term "substituted" when used to describe a group, for example, when referring to a substituted analog of a particular group, is intended to describe any non-hydrogen moiety that formally replaces a hydrogen in that group, and is intended to be non-limiting. Also, unless otherwise specified, a group or groups can also be referred to herein as "unsubstituted" or by equivalent terms such as "non-substituted," which refers to the original group in which a non-hydrogen moiety does not replace a hydrogen within that group. Moreover, unless otherwise specified, "substituted" is intended to be non-limiting and include inorganic sub stituents or organic substituents as understood by one of ordinary skill in the art.

The terms "contacting," "combining," and the like are used herein to describe systems and methods in which the materials are contacted or combined together in any order, in any manner, and for any length of time, unless otherwise specified. For example, the materials can be contacted or combined by blending, mixing, slurrying, fluidizing, and the like, using any suitable technique.

The term "polymer" is used herein generically to include olefin homopolymers, copolymers, terpolymers, and the like, as well as alloys and blends thereof. The term "polymer" also includes impact, block, graft, random, and alternating copolymers. A copolymer can be derived from an olefin monomer and one olefin comonomer, while a terpolymer can be derived from an olefin monomer and two olefin comonomers. Accordingly, "polymer" encompasses copolymers and terpolymers. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof, and having any suitable density. Thus, an ethylene polymer encompasses polymers often referred to in the art as plastomers, elastomers, LLDPE (linear low density polyethylene), MDPE (medium density polyethylene), HDPE (high density polyethylene), as well as ULDPE, VLDPE, LDLPE, and the like. As an example, an ethylene copolymer can be derived from ethylene and a comonomer, such as propylene, 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, if present and unless stated otherwise, and such configurations can include isotactic, syndiotactic, and random symmetries. The term "polymer" also is meant to include all molecular weight polymers, and is inclusive of lower molecular weight polymers.

As it pertains to molecular weight distribution (MWD), multimodal includes bimodal and trimodal molecular weight distributions. A multimodal MWD can comprise humps and tails in the molecular weight distribution. The multimodal MWD can comprise high (or higher) molecular weight and low (or lower) molecular weight components that have different absolute molecular weights (Mn, Mw, Mz), the same or different molecular weight distributions (Mw/Mn, Mz/Mw), the same or different rheological parameters (Carreau-Yasuda "a" parameter, HLMI/MI, $MI_5/MI_2$), and so forth. As an example, a bimodal ethylene polymer can comprise a high or higher molecular weight (HMW) component (or a first component) and a low or lower molecular weight (LMW) component (or a second component). These component terms are relative, are used in reference to each other, and are not limited to the actual molecular weights of the respective components. The molecular weight characteristics of these BMW and LMW components can be determined by deconvoluting the composite (overall polymer) molecular weight distribution, conventionally determined using gel permeation chromatography. The relative amounts of the HMW and LMW components (weight percentages) in the polymer can be determined using a commercial software program (Systat Software, Inc., PEAK FIT v. 4.05). The other molecular weight parameters for the HMW and LMW components (e.g., Mn, Mw, Mz, etc., of each component) can be determined by using the deconvoluted data from the PEAK FIT program, and applying a PEAK FIT Chromatography/Log Normal 4-Parameter (Area) Function and two peaks without any constraints in deconvolution, per below (where $a_0$=area; $a_1$=center; $a_2$=width (>0); and $a_3$=shape (>0, ≠1)):

$$y = \frac{a_0\sqrt{\ln(2)}(a_3^2-1)}{a_2 a_3 \ln(a_3)\sqrt{\pi}\exp\left[\frac{\ln(a_3^2)}{4\ln(2)}\right]} \exp\left[-\frac{\ln(2)\ln\left(\frac{(x-a_1)(a_3^2-1)}{a_2 a_3}+1\right)^2}{\ln(a_3)^2}\right]$$

In this disclosure, while systems and methods are described in terms of "comprising" various components or steps, the systems and methods also can "consist essentially of" or "consist of" the various components or steps, unless stated otherwise. The terms "a," "an," and "the" are intended to include plural alternatives, e.g., at least one. For instance, the disclosure of "a reactor" is meant to encompass one reactor, or combinations of more than one reactor, unless otherwise specified.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, the polymerization temperature in a loop reactor can fall within different ranges in aspects of this invention. By a disclosure that the polymerization temperature is a range from 40° C. to 130° C., the intent is to recite that the polymerization temperature can be any temperature in the range and, for example, can include any range or combinations of ranges from 40° C. to 130° C., such as from 60° C. to 120° C., or from 75° C. to 115° C., and so forth. Likewise, all other ranges disclosed herein should be interpreted in a manner similar to this example.

In general, an amount, size, formulation, parameter, range, or other quantity or characteristic is "about" or "approximately" whether or not expressly stated to be such. Whether or not modified by the term "about" or "approximately," the claims include equivalents to the quantities or characteristics.

Although any methods, systems, steps, and components similar or equivalent to those described herein can be used in the practice or testing of the invention, the typical methods, systems, steps, and components are herein described.

All publications and patents mentioned herein are incorporated herein by reference in their entirety for the purpose of describing and disclosing, for example, the constructs and methodologies that are described in the publications and patents, which might be used in connection with the presently described invention.

DETAILED DESCRIPTION OF THE INVENTION

Disclosed herein are polymerization processes and polymerization reactor systems for producing multimodal ethylene polymers in which at least one loop reactor and at least one fluidized bed reactor are utilized.

Processes for Producing Multimodal Ethylene Polymers

Aspects of this invention are directed to a process for producing a multimodal ethylene polymer. For example, a first process for producing a multimodal ethylene polymer can comprise (or consist essentially of, or consist of) (i) contacting a catalyst composition with ethylene, an optional first olefin comonomer, and hydrogen in an inert hydrocarbon diluent in a loop reactor under slurry or supercritical polymerization conditions to produce a first ethylene polymer, (ii) discharging a first reactor effluent containing the first ethylene polymer from the loop reactor, (iii) separating a light fraction comprising hydrogen from the first reactor effluent to form an intermediate material, and (iv) contacting the intermediate material with ethylene and an optional second olefin comonomer in an inert gas and/or hydrocarbon in a fluidized bed reactor under gas phase polymerization conditions to produce the multimodal ethylene polymer. In the first process, optionally, hydrogen can be present in step (iv), thus the gas phase polymerization in the fluidized bed reactor can be performed in the presence of added hydrogen. Hydrogen can be used to control the molecular weight of polymer produced in each reactor, and the amount of hydrogen present in the loop reactor can be the same as or different from the amount of hydrogen present in the fluidized bed reactor. Depending upon the type of multimodal ethylene polymer being produced, the first olefin comonomer is present in step (i), or the second olefin comonomer is present in step (iv), or both the first olefin comonomer is present in step (i) and the second olefin comonomer is present in step (iv). In the latter case, the first olefin comonomer (and its relative amount) in step (i) can be the same as or different from the second olefin comonomer (and its relative amount) in step (iv).

In another aspect, a second process for producing a multimodal ethylene polymer can comprise (or consist essentially of, or consist of) (i) contacting a catalyst composition with ethylene, an optional first olefin comonomer, and optional hydrogen in an inert hydrocarbon diluent in a first loop reactor under slurry or supercritical polymerization conditions to produce a first ethylene polymer, (ii) discharging a first reactor effluent containing the first ethylene polymer from the first loop reactor and introducing the first reactor effluent into a second loop reactor, (iii) contacting the first reactor effluent with ethylene, an optional second olefin comonomer, and optional hydrogen in the second loop reactor under slurry or supercritical polymerization conditions to produce a second ethylene polymer, (iv) discharging a second reactor effluent containing the second ethylene polymer from the second loop reactor, (v) separating a light fraction comprising hydrogen from the second reactor effluent to form an intermediate material, wherein hydrogen is present in step (i), or step (iii), or both, and (vi) contacting the intermediate material with ethylene and an optional third olefin comonomer in an inert gas and/or hydrocarbon in a fluidized bed reactor under gas phase polymerization conditions to produce the multimodal ethylene polymer. In the second process, optionally, hydrogen can be present in step (i) or step (iii), or hydrogen can be present in both step (i) and step (iii), and the amount of hydrogen present in the first loop reactor can be the same as or different from the amount of hydrogen present in the second loop reactor. Depending upon the type of multimodal ethylene polymer being produced, the first olefin comonomer is present in step (i), or the second olefin comonomer is present in step (iii), or the third olefin comonomer is present in step (vi), or any combination thereof. In the latter case, any of the first olefin comonomer (and its relative amount) in step (i), the second olefin comonomer (and its relative amount) in step (iii), and the third olefin comonomer (and its relative amount) in step (vi) can be the same or different.

In yet another aspect, a third process for producing a multimodal ethylene polymer can comprise (or consist essentially of, or consist of) (i) contacting a catalyst composition with ethylene and an optional first olefin comonomer in an inert gas and/or hydrocarbon in a fluidized bed reactor under gas phase polymerization conditions to produce a first ethylene polymer, (ii) discharging a first reactor effluent containing the first ethylene polymer from the fluidized bed reactor, (iii) combining an inert hydrocarbon diluent with the first reactor effluent and increasing the pressure to form an intermediate material, and (iv) contacting the intermediate material with ethylene and an optional second olefin comonomer in a loop reactor under slurry or supercritical polymerization conditions to produce the multimodal ethylene polymer. In the third process, optionally, hydrogen can be present in step (i) or step (iv), or hydrogen can be present in both step (i) and step (iv), and the amount of hydrogen present in the fluidized bed reactor can be the same as or different from the amount of hydrogen present in the loop reactor. Depending upon the type of multimodal ethylene polymer being produced, the first olefin comonomer is present in step (i), or the second olefin comonomer is present in step (iv), or both the first olefin comonomer is present in step (i) and the second olefin comonomer is present in step (iv). In the latter case, the first olefin comonomer (and its relative amount) in step (i) can be the same as or different from the second olefin comonomer (and its relative amount) in step (iv).

In still another aspect, a fourth process for producing a multimodal ethylene polymer can comprise (or consist essentially of, or consist of) (i) contacting a first catalyst composition with ethylene and an optional first olefin comonomer in an inert hydrocarbon diluent in a loop reactor under slurry or supercritical polymerization conditions to produce a first ethylene polymer, (ii) contacting a second catalyst composition with ethylene and an optional second olefin comonomer in an inert gas and/or hydrocarbon in a fluidized bed reactor under gas phase polymerization conditions to produce a second ethylene polymer, and (iii) combining the first ethylene polymer and the second ethylene polymer to produce the multimodal ethylene polymer. In the fourth process, optionally, hydrogen can be present in step (i) or step (ii), or hydrogen can be present in both step (i) and step (ii), and the amount of hydrogen present in the fluidized bed reactor can be the same as or different from the amount of hydrogen present in the loop reactor. Depending upon the type of multimodal ethylene polymer being produced, the first olefin comonomer is present in step (i), or the second olefin comonomer is present in step (ii), or both the first olefin comonomer is present in step (i) and the second olefin comonomer is present in step (ii). In the latter case, the first olefin comonomer (and its relative amount) in step (i) can be the same as or different from the second olefin comonomer (and its relative amount) in step (ii).

Generally, the features of the first, second, third, and fourth processes (e.g., the loop reactor(s), the fluidized bed reactor(s), the polymerization conditions in the respective reactors, the catalyst composition(s), and the multimodal ethylene polymer, among others) are independently described herein and these features can be combined in any combination to further describe the disclosed process for producing a multimodal ethylene polymer. Moreover, additional process steps can be performed before, during, and/or after the steps of these processes, and can be utilized without limitation and in any combination to further describe the first, second, third, and fourth processes for producing a multimodal ethylene polymer, unless stated otherwise.

Each catalyst composition used in the first, second, third, and fourth processes, independently, can be any suitable transition metal-based catalyst system. The catalyst composition can comprise, for example, a transition metal (one or more than one) from Groups 3-10 of the Periodic Table of the Elements (e.g., nickel). In one aspect, the catalyst composition can comprise a Group 4, 5, or 6 transition metal, or a combination of two or more transition metals. The catalyst composition can comprise chromium, titanium, zirconium, hafnium, vanadium, or a combination thereof, in another aspect, or can comprise chromium, titanium, zirconium, hafnium, or a combination thereof, in yet another aspect. For instance, each catalyst composition, independently, can be a supported catalyst system comprising a transition metal (e.g., chromium, vanadium, titanium, zirconium, hafnium, or a combination thereof) supported on a suitable support (e.g., a solid oxide or a chemically-treated solid oxide), wherein supported indicates that the transition metal is impregnated onto, and/or mixed or co-gelled with a porous solid support. Typical solid supports include solid oxides, activator-supports (chemically-treated solid oxides), molecular sieves and zeolites, clays and pillared clays, and the like. For example, the catalyst composition can comprise chromium impregnated onto silica, chromium impregnated onto silica-titania, chromium impregnated onto aluminophosphate, chromium co-gelled with silica, chromium co-gelled with silica-titania, or chromium co-gelled with aluminophosphate, and this includes any combinations of these materials.

Various catalyst compositions known to a skilled artisan are useful in the polymerization of olefins. These include, but are not limited to, Ziegler-Natta based catalyst systems, chromium-based catalyst systems, metallocene-based catalyst systems, nickel-based catalyst systems, and the like, including combinations thereof. The polymerization processes and reactor systems disclosed herein are not limited to the aforementioned catalyst systems, but nevertheless, particular aspects directed to these catalyst systems are contemplated. Hence, the catalyst composition can be a Ziegler-Natta based catalyst system, a chromium-based catalyst system, and/or a metallocene-based catalyst system; alternatively, a Ziegler-Natta based catalyst system; alternatively, a chromium-based catalyst system; alternatively, a metallocene-based catalyst system; or alternatively, a nickel-based catalyst system. In one aspect, the catalyst composition can be a dual catalyst system comprising at least one metallocene compound, while in another aspect, the catalyst composition can be a dual catalyst system comprising two different metallocene compounds.

Examples of representative and non-limiting catalyst compositions include those disclosed in U.S. Pat. Nos. 3,887,494, 3,119,569, 4,053,436, 4,981,831, 4,364,842, 4,444,965, 4,364,855, 4,504,638, 4,364,854, 4,444,964, 4,444,962, 3,976,632, 4,248,735, 4,297,460, 4,397,766, 2,825,721, 3,225,023, 3,226,205, 3,622,521, 3,625,864, 3,900,457, 4,301,034, 4,547,557, 4,339,559, 4,806,513, 5,037,911, 5,219,817, 5,221,654, 4,081,407, 4,296,001, 4,392,990, 4,405,501, 4,151,122, 4,247,421, 4,397,769, 4,460,756, 4,182,815, 4,735,931, 4,820,785, 4,988,657, 5,436,305, 5,610,247, 5,627,247, 3,242,099, 4,808,561, 5,275,992, 5,237,025, 5,244,990, 5,179,178, 4,855,271, 4,939,217, 5,210,352, 5,401,817, 5,631,335, 5,571,880, 5,191,132, 5,480,848, 5,399,636, 5,565,592, 5,347,026, 5,594,078, 5,498,581, 5,496,781, 5,563,284, 5,554,795, 5,420,320, 5,451,649, 5,541,272, 5,705,478, 5,631,203, 5,654,454, 5,705,579, 5,668,230, 6,300,271, 6,831,141, 6,653,416, 6,613,712, 7,294,599, 6,355,594, 6,395,666, 6,833,338, 7,417,097, 6,548,442, 7,312,283, 7,026,494, 7,041,617, 7,199,073, 7,226,886, 7,517,939, 7,619,047, 7,919,639, and 8,080,681.

In some aspects, the catalyst composition, in addition to a transition metal, can contain an activator and an optional co-catalyst. Illustrative activators can include, but are not limited to, aluminoxane compounds (e.g., methylaluminoxane, MAO), organoboron or organoborate compounds, ionizing ionic compounds, activator-supports (e.g., a solid oxide treated with an electron-withdrawing anion), and the like, or combinations thereof. Commonly used polymerization co-catalysts can include, but are not limited to, metal alkyl, or organometal, co-catalysts, with the metal encompassing boron, aluminum, zinc, and the like. For instance, alkyl boron and/or alkyl aluminum compounds often can be used as co-catalysts in a transition metal-based catalyst system. Representative compounds can include, but are not limited to, tri-n-butyl borane, tripropylborane, triethylborane, trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, including combinations thereof. Exemplary organozinc compounds that can be used as co-catalysts can include, but are not limited to, dimethylzinc, diethylzinc (DEZ), dipropylzinc, dibutylzinc, dineopentylzinc, di(trimethylsilyl)zinc, di(tri ethyl silyl)zinc, di(triisoproplysilyl) zinc, di(triphenylsilyl)zinc, di(allyldimethylsilyl)zinc, di(trimethylsilylmethyl)zinc, and the like, or combinations thereof.

The solid support or supported catalyst used in any catalyst composition disclosed herein can have any suitable surface area, pore volume, particle size, particle size distribution, and sphericity, as would be recognized by those of skill in the art.

In the polymerization processes and reactor systems disclosed herein, each catalyst composition, independently, can be contacted with ethylene (to form an ethylene homopolymer) or with ethylene and an olefin comonomer (to form an ethylene copolymer, ethylene terpolymer, etc.). Suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to one aspect, the olefin comonomer can comprise an α-olefin (e.g., a $C_3$-$C_{10}$ α-olefin), while in another aspect, the comonomer can comprise propylene, 1-butene, 1-pentene, 1-hexene, 1-octene, 1-decene, styrene, or any combination thereof alternatively, the olefin comonomer can comprise 1-butene, 1-hexene, 1-octene, or a combination thereof; alternatively, the olefin comonomer can comprise 1-butene; alternatively, the olefin comonomer can comprise 1-hexene; or alternatively, the olefin comonomer can comprise 1-octene.

As disclosed hereinabove, each catalyst composition used in the first, second, third, and fourth processes, independently, can be contacted with ethylene and optionally an olefin comonomer. When present, the comonomer concentration can be the same or different in each reactor used in the process, and similarly, the ethylene concentration can be the same or different in each reactor used in the process. In one aspect, a comonomer can be used in at least one loop reactor, or in at least one fluidized bed reactor, or in at least one loop reactor and at least one fluidized bed reactor. The comonomer used in the loop reactor can be the same as or different from the comonomer used in the fluidized bed reactor. Additionally, more than one comonomer can be used (e.g., mixed and injected together) in any reactor (e.g., no comonomer in the loop reactor, but two comonomers in the fluidized bed reactor). Additionally or alternatively, multiple fluidized bed reactors with different comonomers can be used for terpolymers and trimodal resins.

Generally, each ethylene polymer produced in each reactor in the first, second, third, and fourth processes, independently, can comprise an ethylene homopolymer and/or an ethylene/α-olefin copolymer (e.g., a $C_3$-$C_{10}$ α-olefin) in one aspect, and can comprise an ethylene homopolymer, an ethylene/1-butene copolymer, an ethylene/1-hexene copolymer, and/or an ethylene/1-octene copolymer in another aspect, and can comprise an ethylene/α-olefin copolymer and/or an ethylene terpolymer (e.g., ethylene with 1-butene and 1-hexene) in yet another aspect, and can comprise an ethylene/1-butene copolymer in still another aspect.

Articles of manufacture can be formed from, and/or can comprise, the multimodal ethylene polymers of this invention and, accordingly, are encompassed herein. For example, articles which can comprise the polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product (e.g., panels for walls of an outdoor shed), outdoor play equipment (e.g., kayaks, bases for basketball goals), a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992.

In some aspects of this invention, the article of manufacture can comprise any of multimodal ethylene polymers described herein, and the article of manufacture can be or can comprise a film, such as a blown film; alternatively, a pipe product; or alternatively, a blow molded product, such as a blow molded bottle.

Referring now to the each loop reactor in the first, second, third, and fourth processes, generally ethylene, an inert hydrocarbon diluent, a catalyst composition, hydrogen (if used), and olefin comonomer (if used) can be continuously fed into the loop reactor where polymerization occurs under slurry or supercritical polymerization conditions. A reactor effluent containing a suspension of polymer particles and the diluent, and unreacted ethylene, can be continuously removed from the loop reactor. In some aspects, the wt. % solids (based on reactor contents) in the each loop reactor independently can range from 30 wt. % to 55 wt. %, or from 40 wt. % to 70 wt. %. In other aspects, the polymerization conditions include wt. % solids contents of less than 50 wt. %, less than 40 wt. %, or less than 30 wt. %, such as from 25 wt. % to 45 wt. %, or from 30 wt. % to 40 wt. %.

Suitable inert hydrocarbon diluents used in loop reactor(s) include, but are not limited to, propane, isobutane, n-butane, n-pentane, isopentane, neopentane, cyclohexane, n-hexane, heptane, cycloheptane, octane, and the like, as well as any combination thereof. If more than one loop reactor is used to produce the multimodal ethylene polymer, then the inert hydrocarbon diluent in one loop reactor can be the same as or different from the other loop reactor. The selection of the inert hydrocarbon diluent can be based on many factors including polymerization temperature and pressure, whether supercritical conditions are employed, and polymer dissolution, among others. In one aspect, for example, the inert hydrocarbon diluent comprises (or consists essentially of, or consists of) propane, while in another aspect, the inert hydrocarbon diluent comprises (or consists essentially of, or consists of) isobutane.

General information on loop slurry reactors and suitable polymerization conditions can be found, for example, in U.S. Pat. Nos. 3,248,179, 4,501,885, 5,565,175, 5,575,979, 6,239,235, 6,262,191, 6,833,415, and 8,822,608. Nonetheless, typical slurry or supercritical polymerization conditions include a polymerization temperature that can range from 40° C. to 130° C., from 60° C. to 120° C., or from 75° C. to 115° C., and a polymerization pressure in a range from 200 to 1500 psig, from 400 to 1200 psig, from 450 to 850 psig, or from 900 to 1100 psig, although the polymerization temperatures and pressures are not limited solely to these representative ranges. In an aspect, the loop reactor (or each loop reactor independently) can be configured for a maximum allowed working pressure (MAWP) of the respective reactor that is greater than, at least 5% greater than, and/or up to 30% greater than, the operating pressure or the polymerization pressure. Suitable pressure relief valves can be configured to relieve, therefore, at the MAWP and/or at 5% greater than the MAWP, and so forth.

In the second process, the first polymerization pressure in the first loop reactor and the second polymerization pressure in the second loop reactor often can be within 25% of each other, and in some instances, within 20%, within 10%, or within 5%, of each other.

Additional slurry or supercritical polymerization conditions in the first, second, third, and fourth processes, include an average residence time in each loop reactor, independently, of from 10 to 90 min, with other suitable ranges for the average residence time ranging from 15 to 75 min, or from 20 to 60 min. Linear velocities within each loop reactor, independently, often are as low as 10 ft/sec and up to 60 ft/sec, with typical ranges including from 15 to 55 ft/sec and from 20 to 50 ft/sec, although not limited thereto.

In an aspect, the slurry polymerization conditions in the loop reactor encompass polymerization conditions in which the inert hydrocarbon diluent is a liquid in the loop reactor. For example, the polymerization temperature and pressure in the loop reactor can be below the critical point, or the polymerization temperature can be below the critical point and the pressure above the critical point. An illustrative inert hydrocarbon diluent used under such conditions is isobutane.

In another aspect, the supercritical conditions in the loop reactor encompass polymerization conditions in which both polymerization temperature and the polymerization pressure in the loop reactor are above the critical points. An illustrative inert hydrocarbon diluent used under such conditions is propane — often termed supercritical propane. Herein, supercritical conditions include temperature and pressure conditions in which the diluent such as propane is supercritical (termed supercritical propane, where the propane is present above its temperature and pressure critical points), as well as temperature and pressure conditions in which all reactor contents are supercritical (above the respective temperature and pressure critical points for the respective materials). The supercritical conditions (e.g., temperature and pressure) can be readily determined by a skilled artisan. For instance, conditions for supercritical propane include a pressure at or above ~618 psia and a temperature at or above 96° C. Thus, representative conditions for supercritical propane in the loop reactor include polymerization temperatures in a range from 90° C. to 130° C., from 96° C. to 120° C., or from 100° C. to 115° C., and polymerization pressures in a range from 700 to 1500 psig, from 800 to 1200 psig, or from 900 to 1100 psig. Beneficially, the polymerization temperature can be below the melting point of the respective ethylene polymer formed in each loop reactor.

Each of the first, second, third, and fourth processes can further include a step of pre-polymerizing in a pre-polymerization reactor prior to step (i). Thus, the catalyst composition prior to step (i) can be pre-polymerized. Any suitable design for the pre-polymerization reactor can be used, such as a stirred tank or a loop reactor design. Pre-polymerization is a polymerization step, but at a much lower reaction rate than the main polymerization operations in the loop reactor(s) and fluidized bed reactor(s) in the first, second, third, and fourth processes. The purpose of pre-polymerization is to prepare the catalyst composition for the main polymerization reactors and reactions. Pre-polymerization influences the polymer bulk properties, which include bulk density, average particle size, particle size distribution, and fines concentration. Morphology (particle shape) depends upon on the particular catalyst composition or the pre-polymerization conditions, or both. Catalyst surface area depends upon the catalyst/support or pre-polymerization conditions, or both. A larger surface area per volume ratio increases the areas of contact between reactant particles. This increases the chances of successful collisions in the reactor. For the same mass fraction of solids, surface area is inversely proportional to the particle diameter (diameter=4PV/SA, 4*pore volume/surface area). Thus, the rate of reaction is increased as surface area increases. Further, better flow properties are generally obtained with spherical catalyst particles and catalyst attrition tends to be lessened compared to irregularly or non-spherically shaped particle beds. Sphericity of the catalyst and polymer in this invention typically range from 0.5 to 1.0, as described in U.S. Pat. No. 10,787,526. Suitable Ziegler-Natta catalysts can be supported on magnesium chloride, or silica, or both, with average particle sizes of from 1 to 50 microns, and titanium loadings on the catalyst ranging from 0.1 to 20 wt. %.

The pre-polymerization reactor can be a continuous loop slurry reactor design. Reactor contents can be circulated at a velocity of from 5 to 100 ft/sec and average residence times of from 1 to 120 minutes. Reactor diameters of from 6 to 36 inches can be used. The response variable or reaction rate can be moderated by control of the reactor temperature, ethylene concentration, catalyst concentration, and activator and/or co-catalyst concentration. Reactor temperatures of 20 to 120° F., ethylene concentrations of from 0.1 to 10 lb/lb catalyst, catalyst concentrations of from 1 to 50 lb/lb of propane, and alkyl concentrations of from 1 to 50 moles of aluminum/mol titanium typically are used.

Discharge from the pre-polymerization reactor can be continuous to the first reactor in the process, or continually to an optional surge tank and optionally to a pump prior to the first reactor in the process (either a loop slurry reactor or a fluidized bed reactor).

Pre-polymerizing the catalyst also can improve polymer bulk properties, and this can be performed with or without a solvent in the presence of ethylene monomer. There are three alternative methods: the first includes the addition of ethylene monomer to the catalyst in a mix tank and then contacting with a co-catalyst, the second includes the addition of ethylene monomer to the catalyst in a mix tank and then contacting with a co-catalyst upstream of a static mixer, and the third includes combining the catalyst with propane solvent and then contacting with co-catalyst and ethylene monomer upstream of a static mixer.

In one aspect, the catalyst can be suspended in propane in the mix tank, where in the absence of co-catalyst in this mix tank, the polymerization reaction does not start. Catalyst slurry from the mix tank can then be transferred (e.g., continuously) to the pre-polymerization reactor where co-catalyst will be added and the controlled pre-polymerization reaction will occur.

Alternatively, in another aspect, the pre-polymerization reaction can be performed in a static mixer. In this aspect, co-catalyst can be added to a catalyst slurry in-line before entering the static mixer.

In yet another aspect, propane can be used in the catalyst slurry and for transport of the catalyst. In this aspect, the pre-polymerization reaction is performed in a static mixer or a stirred tank. Using propane eliminates the polymerization issues up to the static mixer as well as the need for refrigerating vessels and piping.

Whether pre-polymerized or not, each of the first, second, third, and fourth processes can further include a step of introducing the catalyst composition to the loop reactor (or the first loop reactor) in a slurry at a solids content of from 1 to 15 wt. %, from 2 to 14 wt. %, or from 3 to 12 wt. %. Additionally or alternatively, each of the first, second, third, and fourth processes can further include a step of polymerizing in a second fluidized bed reactor under gas phase polymerization conditions. For instance, in the first process, a lower molecular weight HDPE can be formed in the loop reactor, a medium molecular weight LLDPE can be formed in the first gas phase reactor, and a high molecular weight LLDPE can be formed in the second gas phase reactor.

In an aspect of the first, second, third, and fourth processes, each loop reactor independently can produce an ethylene polymer having a lower Mw, a higher MI, and a higher density than that produced by the fluidized bed reactor (which produces a higher Mw, a lower MI, and a lower density ethylene polymer). In another aspect of the first, second, third, and fourth processes, each loop reactor independently can produce an ethylene polymer having a higher Mw, a lower MI, and a lower density than that produced by the fluidized bed reactor (which produces a lower Mw, a higher MI, and a higher density ethylene polymer).

The amount of the multimodal ethylene polymer produced in each reactor is not particularly limited, although for the first, third, and fourth processes, generally from 20 to 90 wt. % (or from 25 to 85 wt. %, or from 30 to 70 wt. %) of the multimodal ethylene polymer is produced in the loop reactor and from 10 to 80 wt. % (or from 15 to 75 wt. %, or from 30 to 70 wt. %) of the multimodal ethylene polymer is produced in the fluidized bed reactor. For the second process, generally from 5 to 30 wt. % (or from 5 to 25 wt. %, or from 10 to 25 wt. %) of the multimodal ethylene polymer is produced in the first loop reactor, from 30 to 60 wt. % (or from 30 to 55 wt. %, or from 35 to 60 wt. %) of the multimodal ethylene polymer is produced in the second loop reactor, and from 30 to 60 wt. % (or from 30 to 55 wt. %, or from 35 to 60 wt. %) of the multimodal ethylene polymer is produced in the fluidized bed reactor. In the second process, the first loop reactor can produce a low to high molecular weight homopolymer, the second loop reactor can produce a lower molecular weight ethylene copolymer, and the fluidized bed reactor can produce medium to high molecular weight ethylene copolymer.

Optionally, at least one contacting step (or each contacting step) in the first, second, third, and fourth processes can further comprise contacting in the presence of an antistatic compound (e.g., Stadis 450 and the like). Accordingly, the antistatic compound can be added into the fluidized bed reactor(s) at one or multiple suitable locations and/or can be added into the loop reactor(s) at one or more suitable locations.

Referring now particularly to the loop reactor(s) in the first, second, third, and fourth processes, each loop reactor independently can have any suitable design or configuration, but beneficially has a length/diameter (L/D) ratio from 500 to 3,000 (e.g., from 700 to 1,500), an inside diameter from to 12 to 48 inches (e.g., from 18 to 40 inches or from 20 to 32 inches), a length from 50 to 300 feet (e.g., from 100 to 250 feet), and with from 2 to 16 legs (e.g., from 4 to 14 legs). The structure of the loop reactor can be supported or free standing.

Further, each loop reactor independently can have an inner surface with a surface roughness of less than or equal to 150 microinches, such as less than or equal to 100, or less than or equal to 50, or from 10 to 50 microinches. Additionally or alternatively, each loop reactor independently can be constructed of any suitable material, including carbon steel, stainless steel, low temperature carbon steel, and the like, as well as combinations thereof.

In an aspect, the loop reactor (or each loop reactor) can be constructed of a rolled plate having two edges joined along a seam. The edges of the rolled plate can be joined along the seam by a weld. The material used in the rolled plate generally has a minimum tensile strength of 50,000 psi. Such construction can enable the use of thinner walls, and typically, the wall thickness can be from ½" to ¾", although not limited thereto. Optionally, the loop reactor (or each loop reactor) can include a rust inhibitor coating on reactor surfaces and flanges.

For temperature monitoring and control, the loop reactor (or each loop reactor) can have multiple thermowell locations, with an appropriate thermocouple or temperature detection device housed within each thermowell. Additionally, each loop reactor comprises a reactor circulating pump, i.e., one or more than one reactor circulating pump, which can be an axial design, radial design, or mixed flow design. The pump diameter can be the same as or greater than the internal diameter of the loop reactor. In an aspect, the pump diameter minus the reactor ID can be from 1 to 8 inches, such as from 1 to 3 inches, from 2 to 4 inches, from 4 to 6 inches, or from 6 to 8 inches, and the like. While not limited thereto, the pump capacity can be from 25,000 gallons per minute (gpm) to 200,000 gpm; alternatively, from 30,000 to 120,000 gpm; or alternatively, from 40,000 to 100,000 gpm. The total head can be from 50 to 400 feet, and more often, from 100 to 350 feet or from 200 to 300 feet. The pump efficiency often can be 80% or less, 70% or less, or 60% or less, but at least 40%. Thus, any pump efficiency from 40 to 80% is encompassed herein. The net positive suction head (NPSH) often can range from 100 to 1,000 feet, and more often, from 100 to 500 feet or from 100 to 300 feet. The brake horsepower of the pump can be in a range from 1,000 to 10,000, such as from 1,000 to 4,000, from 1,000 to 3,000, or from 1,000 to 2,000 HP. If desired, the pump can also comprise guide or straightening vanes to increase the efficiency.

Each loop reactor independently can include an elbow section (or two or more elbow sections) that is/are configured to maintain a Dean number ($D_n$) of the reaction mixture flowing therein to be at least 3,000,000. Thus, the polymerization conditions can include a Dean number ($D_n$) of at least 3,000,000 in an elbow section of the loop reactor. The Dean number ($D_n$) is a dimensionless number defined as follows, $D_n=(\rho V d/\mu)*(d/2R_c)^{1/2}$, where $\rho$ is a density of the reaction mixture in the loop reactor, V is a circulation velocity of the reaction mixture in the loop reactor, d is an internal diameter of the elbow section of the loop reactor, $\mu$ is a dynamic viscosity of the reaction mixture in the loop reactor, and $R_c$ is a radius of inner curvature of the elbow section of the loop reactor. In an aspect, the Dean number ($D_n$) can be at least 4,000,000, at least 5,000,000, or at least 6,000,000, and often up to and including 10,000,000 to 15,000,000, or more.

Beneficially, the loop reactor (or each loop reactor) can include an elbow flow meter. The elbow flow meter can be used to measure the circulation velocity in the loop reactor. The elbow flow meter can a differential-pressure flow meter that includes diaphragms at high and low pressure taps. When a fluid flows through an elbow section of the loop reactor, the centrifugal forces cause a pressure difference between the outer and inner sides of the elbow, and this pressure difference can be used to calculate the flow/circulation velocity and the mass or volumetric flow rate. Beneficially, the elbow flow meter does not require a sensing device in the flow path that might obstruct the circulating reaction mixture with the reactor.

The slurry or supercritical polymerization conditions in each loop reactor, independently, in the first, second, third, and fourth processes can be characterized by a Froude number from 10 to 100 (e.g., from 15 to 50, from 20 to 90, or from 40 to 80). The Froude number is a dimensionless parameter that is indicative of the balance between the suspension and settling tendencies of polymer particles in reactor effluent streams, and such can be applicable to discharge lines and transfer lines (and with or without flashline heaters). The Froude number provides a relative measure of the momentum transfer process to the wall from particles compared to the fluid, and lower values of the Froude number indicate stronger particle-wall (relative to fluid-wall) interactions. The Froude number (Fr) is defined by the equation, $Fr=V/(D*g)^{0.5}$, where V is the average linear velocity (units of ft/s) of the reactor effluent, g is the gravitational constant (32.2 ft/s$^2$), and D is the internal diameter (units of ft) of the discharge or transfer line (or pipe). Hence, in each discharge line or transfer line in the first, second, third, and fourth processes, the reactor effluent can be characterized by a Froude number from 10 to 100, such as from 15 to 50, from 20 to 90, or from 40 to 80.

Additionally or alternatively, the slurry or supercritical polymerization conditions in each loop reactor can be characterized, independently, by a Biot number of less than or equal to 3 (e.g., less than or equal to 2, less than or equal to 1.5, or less than or equal to 1.1). The Biot number is a dimensionless parameter indicative of the balance between the resistance to heat transfer through the wall of the loop reactor and the resistance to heat transfer through a fluid in contact with the reactor wall, or stated another way, the Biot number is indicative of the relative resistance to conductive heat transfer through the reactor wall relative to the convective heat transfer from the reactor contents to the reactor wall. The Biot number (B) is defined by the equation, $B=(h_{slurry}*L_R)/k_R$, where $h_{slurry}$ is a slurry film coefficient (BTU/hr-ft$^2$-° F.), LR is the thickness of the reactor wall (ft), and $k_R$ is the thermal conductivity of the reactor wall (BTU/hr-ft-° F.). Generally, a large value of the Biot number indicates that the conductive resistance to heat transfer through the reactor wall controls the heat transfer from the loop reactor, while a small value of the Biot number indicates that the convective resistance to heat transfer through the reactor contents to the interior surface of the reactor wall controls the heat transfer from the loop reactor. Typically, the conditions in each loop reactor during polymerization can be characterized by a Biot number of less than or equal to 3, or less than or equal to 2, or less than or equal to 1.5, or less than or equal to 1.1.

Additionally or alternatively, the slurry or supercritical polymerization conditions can be characterized by a cavitation number (Ca) of from 6 to 60 (e.g., from 12 to 50, from 18 to 40, or from 24 to 36). The cavitation number is a dimensionless number defined as follows, $Ca=(Pr-Pv)/0.5\rho V^2$, where ρ is a density of the reaction mixture in the loop reactor, Pr is the polymerization pressure, Pv is the vapor pressure of the reaction mixture, and V is a circulation velocity of the reaction mixture in the loop reactor. The polymerization conditions in the loop reactor are such that cavitation is minimized or avoided altogether. In one aspect, the slurry or supercritical polymerization conditions include a cavitation number (Ca) of from 6 to 60, while in another aspect, the Ca is from 12 to 50, and in yet another aspect, the Ca is from 18 to 40, and in still another aspect, the Ca is from 24 to 36.

Additionally or alternatively, the slurry or supercritical polymerization conditions can be characterized by a Euler number of greater than or equal to 5 (e.g., greater than or equal to 6 or greater than or equal to 7). The Euler number (Eu) is a dimensionless number defined as follows, $Eu=\Delta P/\rho V^2$, where ρ is a density of the reaction mixture in the loop reactor, and V is a circulation velocity of the reaction mixture in the loop reactor, and ΔP is the difference between the upstream pressure and the downstream pressure of one or more circulation pumps in the loop reactor. This pressure differential can be at least 20 psig, at least 25 psig, or at least 30 psig, and often as much as 50-100 psig, or more. Beneficially, as the Euler Number increases, higher solids contents within the loop reactor can be achieved.

The respective reactor effluent that is discharged from the respective loop reactor in the first, second, third, and fourth processes can be discharged continuously. There can one discharge location or multiple discharge locations along the loop reactor(s). A continuous take-off (CTO) assembly can extend from an elbow section of the respective loop reactor, from a horizontal section of the respective loop reactor, or a combination of these options. In an aspect, the each loop reactor has a CTO assembly, and does not have one or more settling legs. Moreover, there can be a primary discharge location with a backup discharge line located elsewhere along the loop reactor(s). Any suitable discharge angle, from horizontal to 90°, can be used for the discharge assembly.

The specific design of the effluent discharge from each loop reactor is not particularly limited, although often reactor effluent is discharged from the respective loop reactor continuously through a continuous take-off assembly, which can comprise a valve, a ball valve, a v-ball valve, no valve, any other type of flow restricting apparatus, or any other apparatus that allows a letdown (reduction) in pressure. When the v-ball valve is used, the inside diameter ranges from 0.5 to 6 inches, such as 0.5 to 3 inches, or from 2 to 5 inches. The continuous take-off can be achieved by a conduit (discharge piping) sizing without a valve or any other flow restriction. The discharge from the loop reactor can be at a location downstream or upstream of the circulating pump to take advantage of the pressure differential. Multiple take-offs can be used either on-line on in stand-by modes. The take-off locations can be positioned for a greater solids concentration than the average solid content in the loop reactor.

For the second process in which there is a first loop reactor and a second loop reactor, the discharge location(s) of the first loop reactor often is conveniently at a location of higher pressure (e.g., downstream of the circulating pump) than a feed location(s) of the second loop reactor (e.g., upstream of the circulating pump), although this is not a requirement.

The reactor effluents that are discharged from a loop reactor and/or from a fluidized bed reactor in the first, second, third, and fourth processes can be discharged from the respective reactor into a discharge line, and that discharge line can include a flashline heater. Steam heating is often used in the flashline heater, and after the flashline heater, the temperature of the reactor effluent can range from 55 to 105° C., such as from 75 to 105° C. or from 60 to 100° C., although not limited thereto.

As disclosed herein, discharge from the loop reactor can comprise at least one valve. The take-off valve can be configured to receive the effluent from the product discharge conduit and to control the flow of the effluent. The take-off valve can be any type of control valve known in the art to be useful for controlling flow of the effluent. Such valves include ball valves, v-ball valves, plug valves, globe valves and angle valves. In an aspect, the take-off valve can have a diameter when 100% open in a range of from 1.27 cm (0.5 inches) to 7.62 cm (3 inches). In an aspect, the take-off valve can have a flow channel diameter greater than the largest expected polymer particle size even when the valve is required to be only a small amount open (for example, 20-25% open), which gives a wide control range for the range of openness of the take-off valve (e.g., 20-100% open). The take-off valve may be actuated by a signal from a controller configured to operate the take-off valve in a continuous or a discontinuous (e.g., intermittently opened) manner. The controller can be configured to fully close and then fully open the take-off valve at set intervals and for a certain duration, and to actuate the take-off valve to a percentage of openness, e.g., 20-100% open.

The continuous take-off (CTO) valve can be any valve suitable for a slurry, but a v-ball valve is generally preferred. Vee-ball® Rotary Control valves are available from Fishes Controls International, Inc. of Marshalltown, Iowa.

The v-ball valve can essentially control the pressure of the reactor. In some aspects, by opening the v-ball valve, the pressure within a loop reactor can decrease by allowing a greater flow of slurry to exit the reactor. In such an embodiment, the reverse operation can serve to increase the pressure within the reactor. The pressure sensor and flow sensor disposed along the length of the transfer line can respectively monitor the pressure and flow rate of the slurry passing through the transfer line. The sensors can relay the flow and pressure information to a control system, which can automatically adjust the v-ball valve so that the pressure and flow are within a desired operating range.

A pressure transmitter can be located downstream of the CTO valve. The pressure transmitter can be employed to detect plugging of the CTO valve (by detecting decreased pressure or flow or abnormal valve opening for a given flow) and signal a pressure indicator of the potential plugging. Preferably, the pressure indicator is a diaphragm type pressure indicator, although not limited thereto.

Take-off orientations can be varied. A first option is an attachment angle (the angle between the surface of the reactor and the take-off cylinder outlet), for example, of from 30 degrees to 90 degrees (perpendicular). The attachment angle can be tangential or perpendicular or any angle between 0 and 90 degrees, alternatively, from 20 to 80 degrees, or alternatively, from 30 to 60 degrees. A second option is a curve angle (the orientation relative to how far up the curve of the elbow the attachment, often referred to as an angle alpha). The curve angle can be from 0 to 90 degrees, but is preferably from 20 to 70 degrees, alternatively, from 40 to 60 degrees, or alternatively, from 45 to 70 degrees. Different angles can be selected depending on many factors, including the direction of flow (upward or downward). For example, the curve angle can be approximately 45 degrees or approximately 70 degrees. A third option is an angle (beta) from the center plane of the longitudinal segment. This center plane angle can be from 0 to 60 degrees, and more often from 0 to 45 degrees, such as from 0 to 20 degrees, or approximately 0 degrees.

It can be beneficial to maintain at least one CTO mechanism in inactive status by closing a block valve (or another downstream valve) rather than a ram valve. A CTO is inactive if it is not being used to withdraw effluent slurry as part of the normal commercial production of the multimodal polymer. A flush line and flush valve can also be operated to automatically feed diluent to a slurry discharge line if a downstream valve or block valve is shut or plugged. By closing a block valve or other downstream valve but leaving a ram valve open, the CTO mechanism can be maintained as a "hot spare" or "hot standby" that can rapidly, essentially instantaneously, remotely, and/or automatically be put into use if needed. The CTO can discharge in any angle inclusive of downflow, upflow, or horizontal.

The discharge line can include a heater and can have any suitable configuration. The heater can be an electric heater wrapped around portions of the conduit/line, a heat exchanger such as a shell and tube heat exchanger (e.g., where a heating medium is separated by structural elements which transfer heat to the effluent flowing through the heater), a flashline heater (e.g., with heat added by steam into a jacket, by electric heaters, or by both in alternating portions along the heater), or combinations thereof. The heater can be configured as an open flow channel flashline heater, which is a jacketed pipe of a constant diameter that is heated with steam injected in the jacket at one end and condensate collected from the jacket at the other end of the heater. In the open flow channel configuration, the jacket can include a common collection system for the steam that condenses to water in the jacket after transferring heat to the product mixture that moves through the heater. The collection system can comprise an open downward angle flow section configured to collect the condensate.

Optionally, in the first, second, third, and fourth processes, a catalyst deactivating agent can be introduced into the discharge line, and non-limiting examples of catalyst deactivating agents include water, oxygen, or an alcohol, as well as combinations thereof. Also optionally, a reaction moderating agent can be introduced into the discharge line, for instance, to slow the reaction (not kill the catalyst/reaction) and can be combined with the first reactor effluent (or the second reactor effluent). The reaction moderating agent can be the same material or a different material from the catalyst deactivating agent, but the amount of the reaction moderating agent used is much less. In some aspects, an alcohol is used as the reaction moderating agent, while in other aspects, CO is used.

For the processes in which a fluidized bed reactor follows a loop reactor in series, the reactor effluent that is discharged from the loop reactor (whether heated via a flashline heater or not) is subjected to a separations step in which a light fraction comprising hydrogen is separated from the reactor effluent to form an intermediate material. Often, although not required, the step of separating comprises flashing.

The separator can be embodied as a flash tank, a flash vessel, a flash chamber, a cyclone, a high efficiency cyclone, or a centrifuge. The separator can be in fluid communication with the fluidized bed reactor. The separator can have feed streams from the overhead of the fluidized bed reactor and the discharge of the loop reactor.

A cyclone separator uses centrifugal force to separate particles in a stream comprising a gas. Optionally, the stream can comprise liquid(s). The centrifugal force is a g-force generated by a spinning action. The separator design, inlet conditions, and inlet location all contribute to the centrifugal force. A type of cyclone encompassed herein is a hydrocyclone, which separates particles from a stream comprising a liquid. The cyclone separator can also comprise other means of separation including flashing by a reduction in pressure, settling of the particles by gravity, or other means known in the art.

A cyclone separator downstream of the loop reactor can be a hollow vessel having a conical shape. The top of the cyclone separator generally has a diameter that is greater than a diameter of the bottom of the separator. In an aspect, the cone angle of the cyclone separator can be from 45° to 90°; alternatively, from 50° to 85°; alternatively, from 60° to 90°; alternatively, from 60° to 85°; alternatively, from 60° to 80°; alternatively, from 60° to 70°; or alternatively, from 70° to 80°. The cyclone separator can particularly be a high efficiency cyclone designed for a separation efficiency of greater than 95% efficiency (or greater than 98%, or greater than 99%) for solid particles which have a size of from 2 to 10 microns, or for particles greater than 10 microns, from the gas mixture.

The angle with respect to horizontal of the end of the upper conduit than connects to the cyclone separator can be from 0° to 15°. In another aspect, a vertical distance h between the top of the separator and where the upper conduit connects to the separator can be from 0 m (0 ft) to 6.10 m (20 ft); alternatively, from 0.305 m (1 ft) to 3.048 m (10 ft); alternatively, from 0.305 m (1 ft) to 1.52 m (5 ft). In an aspect, the cyclone separator is a tangential flow cyclone, and the inlet is a tangential inlet. The tangential inlet can have an entrance angle of from 0° to 15°, or alternatively, from 7 to 11°, with respect to a tangent of the cyclone separator. Configuring the cyclone separator as a tangential flow cyclone separator can entail that the inlet is a tangential inlet. The tangential inlet can guide the mixture entering the cyclone separator toward the inner wall to promote separation of the solid particles from the gas mixture.

In an aspect, the tangential entrance velocity into the cyclone separator can be from 15.24 m/s (50 ft/sec) to 30.48 m/s (100 ft/sec); alternatively, from 18.29 m/s (60 ft/sec) to 27.43 m/s (90 ft/sec); or alternatively, from 21.34 m/s (70 ft/sec) to 24.39 m/s (80 ft/sec). Level control within the cyclone typically provides an average residence time of from 5 to 60 minutes.

The pressure differential between the upstream reactor and the second reactor can be utilized to transfer the intermediate material to the second reactor from the flash cyclone. Utilizing the same material for the diluent and the inert gas/hydrocarbon in the loop and fluidized bed reactors can simplify the process. If an alternative diluent is desired in the second reactor, a lock hopper can be utilized to separate the transfer gas from the intermediate material and/or fluff particles. The gas could be returned back to the first reactor through a recycle purification system. The intermediate material and/or fluff could gravity flow through an eductor to the fluidized bed reactor utilizing the circulating gas from the fluidized bed reactor (or other source, such as a slip stream from the fluidization compressor or a totally separate compressor using reactor gas) as the motive fluid to inject the fluff into the active portion of the fluidized bed reactor.

The line or conduit between the flash cyclone and the downstream second reactor could be heated to maintain a targeted temperature. The heater can be an electric heater wrapped around portions of the conduit, a heat exchanger such as a shell and tube heat exchanger (e.g., where a heating medium is separated by structural elements which transfer heat to the product mixture flowing through the heater), a flashline heater (e.g., with heat added by steam into a jacket, by electric heaters, or by both in alternating portions along the heater), or combinations thereof. The heater can be configured as an open flow channel flashline heater, which is a jacketed pipe of a constant diameter that is heater with steam injected in the jacket at one end and condensate collected from the jacket at the other end of the heater. In the open flow channel configuration, the jacket can include a common collection system for the steam that condenses to water in the jacket after transferring heat to the product mixture that moves through the heater. The collection system can comprise an open downward angle flow section configured to collect the condensate.

Referring now particularly to the fluidized bed reactor (or reactors) in the first, second, third, and fourth processes, the fluidized bed reactor can employ a continuous recycle stream containing ethylene and one or more comonomers continuously cycled through the fluidized bed in the presence of the catalyst under gas phase polymerization conditions. The recycle stream can be withdrawn from the fluidized bed reactor and recycled back into the reactor. Simultaneously, an ethylene polymer effluent stream can be withdrawn from the reactor and new or fresh ethylene and optional comonomer can be added to replace the polymerized ethylene and comonomer. General information on fluidized bed reactors and suitable gas phase polymerization conditions can be found, for example, in U.S. Pat. Nos. 5,352,749, 4,588,790, 5,436,304, 7,531,606, and 7,598,327. Nonetheless, typical gas phase polymerization conditions include a polymerization temperature that can range from 48° C. to 95° C., from 50° C. to 85° C., or from 55° C. to 82° C., and a polymerization pressure in a range from 200 to 500 psig, from 200 to 400 psig, from 250 to 650 psig, or from 250 to 350 psig, although the polymerization temperatures and pressures are not limited solely to these representative ranges.

The gas phase polymerization conditions in the fluidized bed reactor also include a fluidization velocity generally ranging from 1.5 to 3 ft/sec, such as from 1.5 to 2.7 ft/sec, or from 1.7 to 2.7 ft/sec. The inert gas and/or hydrocarbon in the fluidized bed reactor can include any suitable inert gasses and/or inert hydrocarbons, but typically, nitrogen, ethane, propane, or combinations thereof are utilized. In circumstances where propane is used as the inert hydrocarbon diluent in a loop reactor preceding the fluidized bed reactor, the propane from the loop reactor can be in the liquid phase before it enters the fluidized bed reactor. By using a non-condensable hydrocarbon instead of an inert gas, such as nitrogen, the heat capacity of the gaseous mixture in the fluidized bed reactor is increased, which can increase heat removal from the fluidized bed reactor and increase production capacity (e.g., from 5 to 100%, or from 10 to 50%). In a further aspect, some or all of the nitrogen used to convey any catalyst into the fluidized bed reactor can be replaced with an inert hydrocarbon, such as propane.

In the fluidized bed reactor (or reactors) in the first, second, third, and fourth processes, the gas phase polymerization conditions can include the presence of, during gas phase polymerization, a $C_3$-$C_8$ alkane or $C_4$-$C_8$ alkane condensable agent, e.g., butane (e.g., n-butane and/or isobutane), pentane (e.g., n-pentane and/or isopentane), hexane, and the like, or combinations thereof, at any amount up to 30 vol %, based on reactor contents. Typical amounts of the condensable agent range from 5 to 30 vol %, from 10 to 30 vol %, or from 15 to 25 vol %, although not limited thereto. Note that propane can act as an inert gas and/or hydrocarbon, or a condensable agent, or both, depending upon operating conditions of the fluidized bed reactor.

The fluidized bed reactor can have a reaction zone comprising a cylindrical portion extending from a bottom end toward a top end of the reactor and having a reaction zone circumference, and an expansion zone above the reaction zone and having an expansion zone circumference at each vertical distance along the expansion zone that is greater than the reaction zone circumference. Suitable control systems can be utilized to monitor key aspects of the gas phase polymerization process. For instance, the processes for producing the multimodal ethylene polymer can further comprising determining and/or controlling the bed height (or the level of solids) within the fluidized bed reactor. Once determined, the bed height (or the level of solids) within the fluidized bed reactor can be adjusted by adjusting a solids removal rate, a fluidization velocity, a catalyst feed rate, a reactor gas density, a reactor gas composition, a polymerization temperature, a polymerization pressure, or any combination of these factors.

Similar to the loop reactor, discharge from the fluidized bed reactor can be intermittent or continuous, at one location or more than location about the fluidized bed reactor. In one aspect, for instance, each ethylene polymer or reactor effluent that is discharged from the respective fluidized bed reactor can be through a lock hopper. In another aspect, each ethylene polymer or reactor effluent is discharged from the respective fluidized bed reactor continuously.

Any method or apparatus for discharging from the loop slurry reactor described herein (e.g., CTO valves, discharge orientations, etc.) also can be utilized for discharging from the fluidized bed reactor. In an aspect, the effluent stream containing the multimodal polymer is continuously withdrawn from the fluidized bed reactor and conveyed to a separations vessel by a pressure differential between the fluidized bed reactor and the separations vessel (while not limited thereto, the fluidized bed reactor can operate at a pressure from 250 psig to 600 psig, and the separation vessel can operate at a pressure from 5 psig to 200 psig).

The separations vessel can be positioned downstream of the loop reactor and upstream of the fluidized bed reactor for advantageous layout and cost considerations. The vertical spacing of the separations vessel relative to the loop reactor and fluidized bed can be about grade level in one aspect, where the bottom or outlet end of the separations vessel is positioned at a height no greater than about the height of the fluidized bed reactor. In another aspect, the bottom or outlet of separations vessel is positioned at a height above that of the inlet of the fluidized bed reactor (thus, no pump is needed to transfer intermediate material from the separator to the fluidized bed reactor). In another aspect, the bottom or outlet of the separations vessel is positioned at a height equal to or greater than the height of the top of the fluidized bed reactor. In another aspect, the bottom of the separations vessel is positioned at a vertical height relative to grade minimally sufficient (that is, without unnecessary excess height) to allow for placement of a valve and transfer line below the separations vessel. In another aspect, the bottom of the separations vessel is positioned at a vertical height relative to grade of about 0 feet; alternatively, about 10 feet; alternatively, about 25 feet, alternatively, about 50 feet; alternatively, about 100 feet; or alternatively, about 500 feet.

The horizontal distance between the separations vessel and the respective reactors also can be varied based on layout and cost considerations. In an aspect, the first pressure differential transfers the first reactor effluent to a separations vessel that is from 0 to 3,000 horizontal feet from the loop reactor; alternatively, the separations vessel is from 0 to 1,500 horizontal feet from the loop reactor; alternatively, the separations vessel is from 100 to 1,500 horizontal feet from the loop reactor; alternatively, the separations vessel is from 100 to 500 horizontal feet from the loop reactor; alternatively, the separations vessel is from 200 to 500 horizontal feet from the loop reactor. In various aspects, the effluent may travel a linear distance in x, y, and z coordinates, for example through circuitous pipe routing, that is greater than the horizontal distance, the vertical spacing/distance, or both.

In an aspect, a pressure differential between the operating pressures of the separations vessel and fluidized bed reactor transports intermediate material from the separations vessel to the fluidized bed reactor by a low pressure line. In an aspect, the pressure differential comprises a drop in pressure from equal to or less than 275 to 800 psig in the separations vessel to equal to or greater than 200 to 350 psig in the fluidized bed reactor. In an embodiment, employment of a pressure differential to transport polymer from the separations vessel to the fluidized bed reactor eliminates the need for the separations vessel to be positioned at a height greater than the fluidized bed reactor. The distance the polymer must be transported from the separations vessel to the fluidized bed reactor may be adjusted in order to improve polymer fluff transport.

In an aspect, the same material is used as the diluent and the inert gas/hydrocarbon. In another aspect, if the materials are different, a lock hopper can be utilized to separate the transfer gas from the active fluff particles. The gas can be returned back to the loop reactor through a recycle purification system. The fluff could gravity flow through an eductor to the fluidized bed reactor utilizing the circulating gas from the fluidized bed reactor as the motive fluid to inject the fluff into the active portion of the fluidized bed reactor.

The line between the separations vessel, such as a flash cyclone, and the downstream fluidized bed reactor can be heated to maintain a targeted fluff temperature of the intermediate material. The heater can be an electric heater wrapped around portions of the conduit, a heat exchanger such as a shell and tube heat exchanger (e.g., where a heating medium is separated by structural elements which transfer heat to the material mixture flowing through the heater), a flashline heater (e.g., with heat added by steam into a jacket, by electric heaters, or by both in alternating portions along the heater), or combinations thereof. The heater can be configured as an open flow channel flashline heater, which is a jacketed pipe of a constant diameter that is heater with steam injected in the jacket at one end and condensate collected from the jacket at the other end of the heater. In the open flow channel configuration, the jacket can include a common collection system for the steam that condenses to water in the jacket after transferring heat to the product mixture that moves through the heater. The collection system can comprise an open downward angle flow section configured to collect the condensate.

Beneficially, the first, second, third, and fourth processes can further include a step of separating fine polymer particles from unreacted olefins in a gas stream from the fluidized bed reactor, and conveying the fines polymer particles back to the fluidized bed reactor. This can be accomplished via a fines separator (e.g., a cyclone), then passing the fine polymer particles from the fines separator to an eductor (e.g., a vertical eductor), and then conveying the fine polymer particles with a motive gas (e.g., unreacted ethylene) from the eductor back to the fluidized bed reactor.

Optionally, a low level of a deactivator—such as an oxygen-containing stream—can be injected downstream of the fluidized bed reactor and combined with the ethylene polymer to enhance properties (e.g., broaden MWD) and inhibit polymer growth.

The multimodal ethylene polymer produced by the first, second, third, and fourth processes—prior to pelletizing—can have any suitable fluff or powder properties, e.g., bulk density, average particle size, particle size distribution, span, and the like. For instance, from 70 to 90 wt. % of the polymer particles can have a polymer particle size in the 100 to 500 micron size range, and in further aspects, in the 150 to 400 micron size range.

In order to improve the control of the multi-reactor process and to ensure consistent production of the desired multimodal ethylene polymer, each of the first, second, third, and fourth process can further comprise a step of determining and/or controlling a polymer property of the ethylene polymer (e.g., produced in each reactor, and/or the final multimodal ethylene polymer) using any suitable analytical technique. Non-limiting examples include the use of Raman spectroscopy for density determination, a melt flow meter for MI and HLMI determination, a rheometer for determining rheological parameters, a GPC for determining molecular weight parameters, and so forth. These can be used intermittently or continuously, and operated off-line or in-line. Suitable feedback control systems can accompany these analytical techniques, in which the slurry/supercritical polymerization conditions and the gas phase polymerization conditions are adjusted based on the results on the analytical testing of the respective ethylene polymers.

Figure 4:
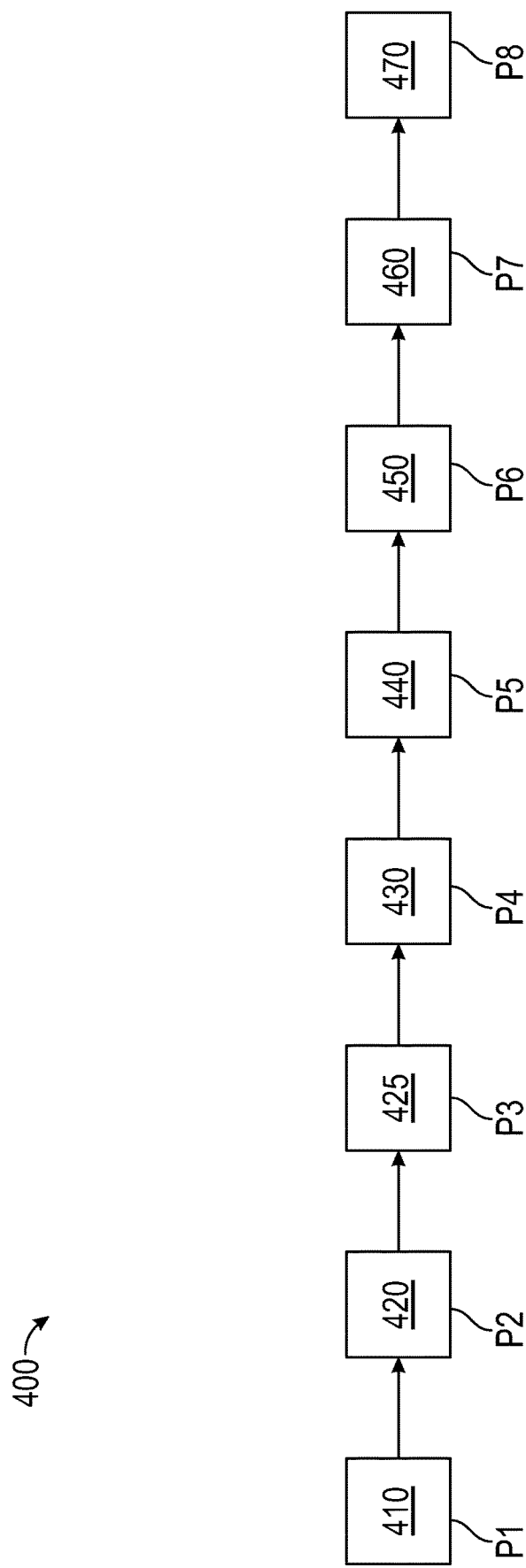
FIG. 4 is a schematic flow diagram of polymerization process with a pressure profile consistent with an aspect of the present invention.

Consistent with aspects of the first, second, third, and fourth processes, an advantageous pressure profile for the multi-reactor process and system is provided herein and represented in the schematic flow diagram of FIG. 4. In the polymerization process and reactor system 400, there is pre-polymerization reactor 410 operated at pressure P1, an optional surge vessel 420 operated at pressure P2, an optional feed pump 425 operated at pressure P3, a loop reactor 430 operated at pressure P4, an intermediate separations vessel 440 operated at pressure P5, a fluidized bed reactor 450 operated at pressure P6, a final separations vessel 460 operated at pressure P7, and a purge column 470 operated at pressure P8.

First, the loop reactor 430 (or each loop reactor independently) can be operated under supercritical conditions at a pressure P4 in a range from 900 to 1100 psig, where supercritical conditions are above the critical pressure and temperature of the fluid (diluent such as propane) within the loop reactor. The step of separating, therefore, can be conducted in a suitable intermediate separations vessel 440 operating at a pressure P5 in a range from 150 to 800 psig and/or conducted under conditions sufficient to remove at least 80 wt. %, at least 90 wt. %, or at least 95 wt. % hydrogen, from the respective reactor effluent. In one aspect of this invention, the pressure ratio of P4/P5 is in a range from 3 to 6, while in another aspect, the ratio of P4/P5 is in a range from 3 to 5.5, and in yet another aspect, the ratio of P4/P5 is in a range from 3.5 to 6, and in still another aspect, the ratio of P4/P5 is in a range from 3.5 to 5.5.

Additionally or alternatively, the fluidized bed reactor 450 can be operated at a pressure P6 in a range from 250 to 600 psig, and a discharge stream from the fluidized bed reactor containing the multimodal ethylene polymer can be introduced into a final separations vessel 460 operating at a pressure P7 in a range from 5 to 200 psig and/or operating under conditions sufficient to remove at least 60 wt. %, at least 70 wt. %, at least 80 wt. %, or at least 90 wt. % of the propane from the discharge stream. Subsequently, the multimodal ethylene polymer can be discharged from the separations vessel 460 into a purge column 470 operating at a pressure P8 in a range from 1 to 20 psig. In an aspect, the ratio of P6/P7 can be greater than the ratio of P4/P5. Beneficially, the ratio of P5/P7 can be in range from 4 to 60 in one aspect, from 5 to 55 in another aspect, and from 10 to 40 in yet another aspect. While not wishing to be bound by theory, it is believe that recovery and recycle of hydrocarbons in the process is improved with P5/P7 ratios in these ranges.

In an aspect, when a step of pre-polymerizing is present in the first, second, third, or fourth processes, such can be conducted in a pre-polymerization loop reactor 410 (e.g., a loop reactor design) at a pressure P1 in a range from 900 to 1200 psig and/or at a pressure greater than P4 (i.e., P1>P4).

In another aspect, when a step of pre-polymerizing is present in the first, second, third, or fourth processes, such can be conducted in a pre-polymerization loop reactor 410 (e.g., a loop reactor design) at a pressure P1 in a range from 400 to 800 psig. Typically, when P1<P4, a feed pump 425 may be needed to increase the pressure on the discharge of the pump (P3). A discharge stream from the pre-polymerization reactor can be introduced into a surge vessel 420 operating at a pressure P2 in a range from 400 to 800 psig and/or at a pressure less than P1 (P2<P1). Further, the discharge stream from the surge vessel 420 can be introduced into the feed pump 425 to increase the discharge pressure P3 from the pump to within a range of 925 to 1200 psig. Since the loop reactor 430 is being operated at supercritical pressure, a higher pressure feed to reactor will be required, and a pump 425 may be beneficial.

Polymerization Reactor Systems

A first polymerization reactor system (or reactor apparatus) for producing a multimodal ethylene polymer consistent with aspects of the present invention can comprise (or consist essentially of, or consist of) (a) a loop reactor configured to contact a catalyst composition with ethylene, an optional first olefin comonomer, and hydrogen in an inert hydrocarbon diluent under slurry or supercritical polymerization conditions to produce a first ethylene polymer, (b) a discharge line configured to withdraw a first reactor effluent containing the first ethylene polymer from the loop reactor, (c) a separator configured to remove a light fraction comprising hydrogen from the first reactor effluent to form an intermediate material, and (d) a fluidized bed reactor configured to contact the intermediate material with ethylene and an optional second olefin comonomer in an inert gas and/or hydrocarbon under gas phase polymerization conditions to produce the multimodal ethylene polymer. In the first polymerization reactor system, the fluidized bed reactor can be further configured to contact hydrogen with the intermediate material, ethylene, and the optional second olefin comonomer. Additionally or alternatively, in the first polymerization reactor system, the loop reactor can be configured to contact the catalyst composition with ethylene, the first olefin comonomer, and hydrogen, or the fluidized bed reactor can be configured to contact the intermediate material with ethylene and the second olefin comonomer, or both the loop reactor can be configured to contact the catalyst composition with ethylene, the first olefin comonomer, and hydrogen, and the fluidized bed reactor can be configured to contact the intermediate material with ethylene and the second olefin comonomer.

A second polymerization reactor system (or reactor apparatus) for producing a multimodal ethylene polymer consistent with aspects of the present invention can comprise (or consist essentially of, or consist of) (a) a first loop reactor configured to contact a catalyst composition with ethylene, an optional first olefin comonomer, and optional hydrogen in an inert hydrocarbon diluent under slurry or supercritical polymerization conditions to produce a first ethylene polymer, (b) a second loop reactor configured to contact a first reactor effluent containing the first ethylene polymer with ethylene, an optional second olefin comonomer, and optional hydrogen under slurry or supercritical polymerization conditions to produce a second ethylene polymer, (c) a transfer line configured to withdraw the first reactor effluent containing the first ethylene polymer from the first loop reactor and to introduce the first reactor effluent into the second loop reactor, (d) a second discharge line configured to withdraw a second reactor effluent containing the second ethylene polymer from the second loop reactor, (e) a separator configured to remove a light fraction comprising hydrogen from the second reactor effluent to form an intermediate material, wherein hydrogen is present in the first loop reactor, the second loop reactor, or both, and (f) a fluidized bed reactor configured to contact the intermediate material with ethylene and an optional third olefin comonomer in an inert gas and/or hydrocarbon under gas phase polymerization conditions to produce the multimodal ethylene polymer. In the second polymerization reactor system, the first loop reactor can be configured to contact the catalyst composition with ethylene, an optional first olefin comonomer, and hydrogen, and/or the second loop reactor can be configured to contact the first reactor effluent with ethylene, an optional second olefin comonomer, and hydrogen. Moreover, in the second polymerization reactor system, the first loop reactor can be configured to contact the catalyst composition with ethylene and the first olefin comonomer, or the second loop reactor can be configured to contact the first reactor effluent with ethylene and the second olefin comonomer, or the fluidized bed reactor can be configured to contact the intermediate material with ethylene and the third olefin comonomer, or any combination of these variations.

A third polymerization reactor system (or reactor apparatus) for producing a multimodal ethylene polymer consistent with aspects of the present invention can comprise (or consist essentially of, or consist of) (a) a fluidized bed reactor configured to contact a catalyst composition with ethylene and an optional first olefin comonomer in an inert gas and/or hydrocarbon under gas phase polymerization conditions to produce a first ethylene polymer, (b) a discharge line configured to withdraw a first reactor effluent containing the first ethylene polymer from the fluidized bed reactor, (c) a transfer line configured to combine an inert hydrocarbon diluent with the first reactor effluent and to increase pressure to form an intermediate material (e.g., the transfer line can include a suitable pump), and (d) a loop reactor configured to contact the intermediate material with ethylene and an optional second olefin comonomer under slurry or supercritical polymerization conditions to produce the multimodal ethylene polymer. In the third polymerization reactor system, the fluidized bed reactor can be further configured to contact the catalyst composition with ethylene, the optional first olefin comonomer, and hydrogen, and/or the loop reactor can be further configured to contact the intermediate material with ethylene, the optional second olefin comonomer, and hydrogen. Additionally or alternatively, in the third polymerization reactor system, the fluidized bed reactor can be configured to contact the catalyst composition with ethylene and the first olefin comonomer, and/or the loop reactor can be configured to contact the intermediate material with ethylene and the second olefin comonomer.

A fourth polymerization reactor system (or reactor apparatus) for producing a multimodal ethylene polymer consistent with aspects of the present invention can comprise (or consist essentially of, or consist of) (a) a loop reactor configured to contact a catalyst composition with ethylene and an optional first olefin comonomer in an inert hydrocarbon diluent under slurry or supercritical polymerization conditions to produce a first ethylene polymer, (b) a fluidized bed reactor configured to contact a second catalyst composition with ethylene and an optional second olefin comonomer in an inert gas and/or hydrocarbon under gas phase polymerization conditions to produce a second ethylene polymer, and (c) a mixing device configured to combine the first ethylene polymer and the second ethylene polymer to produce the multimodal ethylene polymer. In the fourth polymerization reactor system, the loop reactor can be further configured to contact the catalyst composition with ethylene, the optional first olefin comonomer, and hydrogen, and/or the fluidized bed reactor can be further configured to contact the second catalyst composition with ethylene, the optional second olefin comonomer, and hydrogen. Additionally or alternatively, in the fourth polymerization reactor system, the loop reactor can be configured to contact the catalyst composition with ethylene and the first olefin comonomer, and/or the fluidized bed reactor can be configured to contact the second catalyst composition with ethylene and the second olefin comonomer.

Generally, the features of the first, second, third, and fourth systems (e.g., the loop reactor(s), the fluidized bed reactor(s), the polymerization conditions in the respective reactors, the catalyst composition(s), the discharge and transfer lines, the separator, and the multimodal ethylene polymer, among others) are independently described herein and these features can be combined in any combination to further describe the disclosed polymerization reactor systems for producing a multimodal ethylene polymer. Moreover, additional components or devices can be present in these systems, and can be utilized without limitation and in any combination to further describe the first, second, third, and fourth polymerization reactor systems for producing a multimodal ethylene polymer, unless stated otherwise. For instance, each polymerization reactor system can be further configured to introduce one or more than one comonomer into any loop reactor or fluidized bed reactor, and if multiple comonomers are used, then each comonomer can be introduced separately into any reactor, or mixed and injected together into any reactor.

As disclosed hereinabove, each catalyst composition used in the first, second, third, and fourth processes, independently, can be contacted with ethylene and optionally an olefin comonomer. When present, the comonomer concentration can be the same or different in each reactor used in the process, and similarly, the ethylene concentration can be the same or different in each reactor used in the process. In one aspect, a comonomer can be used in at least one loop reactor, or in at least one fluidized bed reactor, or in at least one loop reactor and at least one fluidized bed reactor. The comonomer used in the loop reactor can be the same as or different from the comonomer used in the fluidized bed reactor. Additionally, more than one comonomer can be used (e.g., mixed and injected together) in any reactor (e.g., no comonomer in the loop reactor, but two comonomers in the fluidized bed reactor). Additionally or alternatively, multiple fluidized bed reactors with different comonomers can be used for terpolymers and trimodal resins.

Each of the first, second, third, and fourth systems can further include a pre-polymerization reactor of any suitable design, such as a stirred tank or a loop reactor design. This pre-polymerization reactor, if present, is configured to pre-polymerize the catalyst composition prior to the catalyst system being used in the loop reactor or the fluidized bed reactor. Whether the system includes a pre-polymerization reactor or not, the system can further include a catalyst feed port configured to introduce the catalyst composition into the loop reactor (or the first loop reactor) in a slurry at a solids content of from 1 to 15 wt. %, from 2 to 14 wt. %, or from 3 to 12 wt. %.

Additionally or alternatively, each of the first, second, third, and fourth systems can further include a second fluidized bed reactor configured to operate under gas phase polymerization conditions. For instance, in the first polymerization reactor system, the loop reactor can be configured to produce a lower molecular weight HDPE, the first gas phase reactor can be configured to produce a medium molecular weight LLDPE, and the second gas phase reactor can be configured to produce a high molecular weight LLDPE.

Referring now to each loop reactor in the first, second, third, and fourth polymerization reactor systems, each loop reactor independently can be configured to operate at any slurry or supercritical polymerization conditions, polymerization temperature, polymerization pressure, average residence time, and linear velocity disclosed herein and to use any inert hydrocarbon diluent disclosed herein, e.g., such as described hereinabove for the first, second, third, and fourth processes for producing a multimodal ethylene polymer. For instance, the loop reactor (or each loop reactor independently) can be configured for a maximum allowed working pressure (MAWP) of the respective reactor that is greater than, at least 5% greater than, and/or up to 30% greater than, the operating pressure or the polymerization pressure in the respective reactor. Each loop reactor independently can have one or more pressure relief valves, and these can be configured to relieve at the MAWP and/or at 5% greater than the MAWP, among other pressure options.

In the second system, the first loop reactor and the second loop reactor can be configured for polymerization pressures that are within 25% of each other, and in some instances, within 20%, within 10%, or within 5%, of each other.

In an aspect of the first, second, third, and fourth systems, each loop reactor independently can be configured to produce an ethylene polymer having a lower Mw, a higher MI, and a higher density than that produced by the fluidized bed reactor (which can be configured to produce a higher Mw, a lower MI, and a lower density ethylene polymer). In another aspect of the first, second, third, and fourth systems, each loop reactor independently can be configured to produce an ethylene polymer having a higher Mw, a lower MI, and a lower density than that produced by the fluidized bed reactor (which can be configured to produce a lower Mw, a higher MI, and a higher density ethylene polymer).

The amount of the multimodal ethylene polymer produced in each reactor is not particularly limited, although for the first, third, and fourth systems, generally the system is configured to produce from 20 to 90 wt. % (or from 25 to 85 wt. %, or from 30 to 70 wt. %) of the multimodal ethylene polymer in the loop reactor, and configured to produce from 10 to 80 wt. % (or from 15 to 75 wt. %, or from 30 to 70 wt. %) of the multimodal ethylene polymer in the fluidized bed reactor.

For the second polymerization reactor system, generally the system is configured to produce from 5 to 30 wt. % (or from 5 to 25 wt. %, or from 10 to 25 wt. %) of the multimodal ethylene polymer in the first loop reactor, configured to produce from 30 to 60 wt. % (or from 30 to 55 wt. %, or from 35 to 60 wt. %) of the multimodal ethylene polymer in the second loop reactor, and configured to produce from 30 to 60 wt. % (or from 30 to 55 wt. %, or from 35 to 60 wt. %) of the multimodal ethylene polymer in the fluidized bed reactor. In the second reactor system, the first loop reactor can be configured to produce a low to high molecular weight homopolymer, the second loop reactor can be configured to produce a lower molecular weight ethylene copolymer, and the fluidized bed reactor can be configured to produce a medium to high molecular weight ethylene copolymer.

Optionally, the first, second, third, and fourth polymerization reactor system can be further configured to introduce an antistatic compound into at least one loop reactor or fluidized bed reactor, for example, into one loop reactor, or into one fluidized bed reactor, or into one loop reactor and one fluidized bed reactor.

Each loop reactor in the first, second, third, and fourth systems can have any suitable design or configuration, but beneficially, each loop reactor independently can have a length/diameter (L/D) ratio from 500 to 3,000 (e.g., from 700 to 1,500), an inside diameter from to 12 to 48 inches (e.g., from 18 to 40 inches or from 20 to 32 inches), a length from 50 to 300 feet (e.g., from 100 to 250 feet), and with from 2 to 16 legs (e.g., from 4 to 14 legs). The structure of the loop reactor can be supported or free standing.

Further, each loop reactor independently can have an inner surface with a surface roughness of less than or equal to 150 microinches, such as less than or equal to 100, or less than or equal to 50, or from 10 to 50 microinches. Additionally or alternatively, each loop reactor independently can be constructed of any suitable material, including carbon steel, stainless steel, low temperature carbon steel, and the like, as well as combinations thereof.

In an aspect, the loop reactor (or each loop reactor) can be constructed of a rolled plate having two edges joined along a seam, which can be joined along the seam by a weld. Wall thicknesses of from ½" to ¾" are typical, and materials used for the rolled plate generally have a minimum tensile strength of 50,000 psi. Optionally, the loop reactor (or each loop reactor) can include a rust inhibitor coating on reactor surfaces and flanges.

For temperature monitoring and control, the loop reactor (or each loop reactor) can have multiple thermowell locations, with an appropriate thermocouple or temperature detection device housed within each thermowell. Additionally, each loop reactor comprises a reactor circulating pump, i.e., one or more than one reactor circulating pump, which can be an axial design, radial design, or mixed flow design.

Each loop reactor independently can include an elbow section (or two or more elbow sections) that is/are configured to maintain a Dean number ($D_n$) of the reaction mixture flowing therein to be at least 3,000,000. The Dean number ($D_n$) is a dimensionless number defined as follows, $D_n = (\rho V d/\mu)*(d/2R_c)^{1/2}$, where $\rho$ is a density of the reaction mixture in the loop reactor, V is a circulation velocity of the reaction mixture in the loop reactor, d is an internal diameter of the elbow section of the loop reactor, $\mu$ is a dynamic viscosity of the reaction mixture in the loop reactor, and $R_c$ is a radius of inner curvature of the elbow section of the loop reactor. In an aspect, each loop reactor independently can include an elbow section (or two or more elbow sections) that is/are configured to maintain a Dean number ($D_n$) of at least 4,000,000, at least 5,000,000, or at least 6,000,000, and often up to and including 10,000,000 to 15,000,000, or more.

Beneficially, the loop reactor (or each loop reactor) can include an elbow flow meter. The elbow flow meter can be used to measure the circulation velocity in the loop reactor. In an aspect, the elbow flow meter can a differential-pressure flow meter, which includes diaphragms at high and low pressure taps. These pressure taps are located at the outer and inner sides of the elbow, since centrifugal forces cause a pressure difference between the outer and inner sides of the elbow, and this pressure difference can be used to calculate the flow/circulation velocity and the mass or volumetric flow rate. The elbow flow meter, beneficially, does not have a sensing device in the flow path that might obstruct the circulating reaction mixture with the loop reactor.

Each loop reactor in the first, second, third, and fourth polymerization reactor systems can be configured, independently, to maintain a Froude number from 10 to 100 (e.g., from 15 to 50, from 20 to 90, or from 40 to 80). In an aspect, any discharge line and/or transfer line (and with or without flashline heaters) in the system can be configured for the reactor effluent contained therein to have a Froude number from 10 to 100, such as from 15 to 50, from 20 to 90, or from 40 to 80.

Additionally or alternatively, each loop reactor in the first, second, third, and fourth polymerization reactor systems can be configured, independently, to maintain a Biot number of less than or equal to 3 (e.g., less than or equal to 2, less than or equal to 1.5, or less than or equal to 1.1) during polymerization.

Additionally or alternatively, each loop reactor in the first, second, third, and fourth polymerization reactor systems can be configured, independently, to maintain a cavitation number (Ca) of from 6 to 60 (e.g., from 12 to 50, from 18 to 40, or from 24 to 36).

Additionally or alternatively, each loop reactor in the first, second, third, and fourth polymerization reactor systems can be configured, independently, to maintain a Euler number of greater than or equal to 5 (e.g., greater than or equal to 6 or greater than or equal to 7).

Each respective loop reactor in the first, second, third, and fourth polymerization reactor system can be configured to discharge continuously; thus, the loop reactor can have a continuous take-off assembly. The loop reactor can have one discharge assembly or multiple discharge assembly suitably locations along the loop reactor. For instance, a continuous take-off (CTO) assembly can extend from an elbow section of the respective loop reactor, from a horizontal section of the respective loop reactor, or a combination of these options. In an aspect, the CTO can replace multiple settling legs in a loop reactor. Moreover, there can be a primary reactor discharge assembly with a backup discharge line located elsewhere along the loop reactor(s). Any suitable discharge angle, from horizontal to 90°, can be used for discharge assembly.

The specific design of the effluent discharge from any loop reactor is not particularly limited, although often the loop reactor is configured to discharge reactor effluent continuously through a continuous take-off assembly, which comprises a valve, comprises a v-ball valve, or comprises no valve. When the v-ball valve is used, the inside diameter ranges from 0.5 to 6 inches, such as 0.5 to 3 inches, or from 2 to 5 inches.

The continuous take-off or continuous fluff discharge can be performed through a line where the pressure drop is determined by the line configuration. A valve could also be used.

For the second polymerization reactor system containing a first loop reactor and a second loop reactor, the discharge location(s) of the first loop reactor often is conveniently at a location of higher pressure (e.g., downstream of the circulating pump) than a feed location(s) of the second loop reactor (e.g., upstream of the circulating pump), although this is not a requirement.

The reactor effluents that are discharged from a loop reactor and/or from a fluidized bed reactor in the first, second, third, and fourth polymerization reactor systems can be discharged from the respective reactor into a discharge line (or transfer line), and that discharge line (or transfer line) can include a flashline heater. The flashline heater can utilize steam heating and can be configured to target an effluent discharge temperature—after the flashline heater—ranging from 55 to 105° C., such as from 75 to 105° C. or from 60 to 100° C., although not limited thereto.

Optionally, the first, second, third, and fourth polymerization reactor systems can further include a catalyst deactivating agent inlet or reaction moderating agent inlet into the discharge line (or transfer line). Suitable catalyst deactivating agents or reaction moderating agents can be introduced into the discharge line (or transfer line), as needed, to kill the catalyst/reaction or slow the reaction.

The separator used in the disclosed polymerization reactor systems can comprise a flash chamber, and the flash chamber can be configured to remove a light fraction comprising hydrogen from the reactor effluent to form an intermediate material. In aspect, the separator can further include a cyclone. Suitable cyclones can have a cone angle of from 45° to 90°, from 60° to 90°, from 60° to 80°, from 60 to 70°, or from 70 to 80°, are designed for inlet velocities from 50 ft/sec to 100 ft/sec, and have a tangential entrance at an angle of from of 0 to 15°, such as from 7 to 11°. The cyclone feed can enter the cyclone tangentially at from 0 to 20 feet below the tangent. The cyclone can be designed for greater than 95% efficiency (or greater than 98%, or greater than 99%) for particles greater than 10 microns. The cyclone can be configured with a level control within the cyclone that generally provides an average residence time of from 5 to 60 minutes within the cyclone.

Referring now particularly to the fluidized bed reactor (or reactors) in the first, second, third, and fourth polymerization reactor systems, each fluidized bed reactor (independently) can be configured to operate at any gas phase polymerization conditions, polymerization temperature, polymerization pressure, and fluidization velocity disclosed herein, and can be configured to use any inert gas and/or hydrocarbon disclosed herein, e.g., such as described hereinabove for the first, second, third, and fourth processes for producing a multimodal ethylene polymer.

The fluidized bed reactor (or reactors) in the first, second, third, and fourth systems can further include a condensable agent feed port configured to introduce a $C_3$-$C_8$ alkane (or $C_4$-$C_8$ alkane) condensable agent into each fluidized bed reactor, typically at amounts up to and including 30 vol %, based on fluidized bed reactor contents.

The fluidized bed reactor can have a reaction zone comprising a cylindrical portion extending from a bottom end toward a top end of the reactor and having a reaction zone circumference, and an expansion zone above the reaction zone and having an expansion zone circumference at each vertical distance along the expansion zone that is greater than the reaction zone circumference. The polymerization reactor system can further include suitable control systems for monitoring and controlling key aspects of the gas phase polymerization process in the fluidized bed reactor. For instance, the reactor system can further include a control system configured to control a bed height or a level of solids in the fluidized bed reactor. This control system can include a plurality of nuclear radiation sources disposed along the outer surface of the fluidized bed reactor between the top end and the bottom end, each at a different vertical distances from the bottom end, and a detector array comprising a plurality of radiation detectors disposed along the outer surface of the fluidized bed reactor between the top end and the bottom end, each at a different vertical distance from the bottom end. A line between each radiation detector and each nuclear radiation source passes through the interior space of the fluidized bed reactor. While not limited thereto, the plurality of nuclear radiation sources can include at least one radiation source having a radioactivity of 5000 mCi located on the outer surface of the reaction zone and/or the expansion zone. The control system can include a computer that is configured to compare the measured intensity of the nuclear radiation at the plurality of radiation detectors, and from that information, determine the level of solids in the fluidized bed reactor. The level of solids in the fluidized bed reactor can be adjusted by adjusting a solids removal rate, a fluidization velocity, a catalyst feed rate, a reactor gas density, a reactor gas composition, a polymerization temperature, a polymerization pressure, or any combination of these factors.

Similar to the loop reactor, the fluidized bed reactor can be configured to discharge intermittently or continuously, at one location or more than location about the fluidized bed reactor. In one aspect, for instance, each fluidized bed reactor is configured to discharge reactor effluent or ethylene polymer through a take-off assembly comprising a lock hopper. In another aspect, each fluidized bed reactor is configured to discharge reactor effluent or ethylene polymer continuously (the fluidized bed reactor has a continuous take-off assembly).

In some aspects, the first, second, third, and fourth polymerization reactor systems can further include a fines separator (e.g., a cyclone) configured to separate fine polymer particles from unreacted olefins in a gas stream from the fluidized bed reactor, and to convey the fine polymer particles back to the fluidized bed reactor. For instance, fine polymer particles from the fines separator can be conveyed to an eductor (e.g., vertical eductor), from which the fine polymer particles are conveyed back to the fluidized bed reactor with a motive gas (e.g., unreacted ethylene).

Optionally, the polymerization reactor systems can further include a deactivator inlet configured to inject a low level of deactivator (e.g., an oxygen-containing stream) downstream of the fluidized bed reactor. The purpose of this addition can be to enhance properties (e.g., broaden MWD) and to inhibit polymer growth. Downstream is in the fluidized bed reactor loop stream. The oxygen will contact the catalyst in the reactor which can change the MW of the polymer.

For improved control of the polymerization reactor systems, the various reactors, and the various polymerization conditions, each of the first, second, third, and fourth polymerization reactor systems can further include an analytical system configured to determine and/or control a polymer property of each ethylene polymer produced in a reactor within the system. Any suitable analytical technique can be used, e.g., Raman spectroscopy for density, melt flow meter for MI and HLMI, a rheometer for rheological parameters, a GPC for MWD. Thus, the polymerization reactor systems can further include an analytical system containing a Raman spectrometer, a melt flow meter, a rheometer, a GPC, and the like, as well as combinations thereof. The analytical system can configured to operate intermittently or continuously, and operated off-line or in-line. As part of the analytical system, feedback control can be integrated to adjust the slurry/supercritical polymerization conditions and the gas phase polymerization conditions based on the results on the analytical testing on the respective ethylene polymers.

Referring now to FIG. 1, which illustrates a polymerization reactor system 100 consistent with an aspect of the present invention. The system 100 can include a pre-polymerization reactor 110, a surge vessel 120, a feed pump 125, a loop reactor 130, a discharge line 135, a separator 140B, a fluidized bed reactor 150, and a fluidized bed reactor discharge 155. A catalyst composition feed 105 in FIG. 1 is pre-polymerized in a pre-polymerization reactor 110 to form a pre-polymerized catalyst composition 115, which can then be introduced into the surge vessel 120 and the feed pump 125, and ultimately fed into the loop reactor 130. Alternatively, the catalyst composition feed 105 is not pre-polymerized and is fed directly into the loop reactor 130 (or optionally into the surge vessel 120 and feed pump 125). The catalyst composition feed 105 can contain an inert hydrocarbon diluent, such as isobutane and/or propane. A reactant feed stream 128 also is fed to loop reactor 130, and this feed stream can contain ethylene, comonomer, hydrogen, and inert hydrocarbon diluent. It is understood that there are many different methods in which the catalyst, diluent, olefins, and hydrogen can be introduced—separately or together, and in any combination—into the loop reactor, and this disclosure is not limited solely to those options described in reference to FIG. 1 or otherwise disclosed herein.

In the loop reactor 130, a first ethylene polymer is produced, and a first reactor effluent stream containing the first ethylene polymer is discharged from the loop reactor 130 through discharge line 135. Optionally, prior to separator 140B, the reactor effluent in the discharge line 135 can be heated 138, such as via a flashline heater. In separator 140B, a light fraction containing hydrogen (and optionally some ethylene) is separated overhead, and the intermediate material (containing the first ethylene polymer) exits the separator 140B through eductor 142 and enters fluidized bed reactor 150. A feed stream 144 can supply additional ethylene, comonomer, hydrogen, inert gas and/or hydrocarbon into the fluidized bed reactor 150. A second reactor effluent containing a multimodal ethylene polymer is discharged from the fluidized bed reactor 150 through fluidized bed reactor discharge 155. An overhead stream 158 can exit the fluidized bed reactor 150 and enter the separator 140B and separated into various components, some of which are directly recycled into the fluidized bed reactor 150 via eductor 142. The overhead stream from the separator 140B can pass through a heat exchanger 145, a compressor 148, and mixed in any relative proportion with the feed stream 144, and recycled into the fluidized bed reactor 150.

Figure 2:
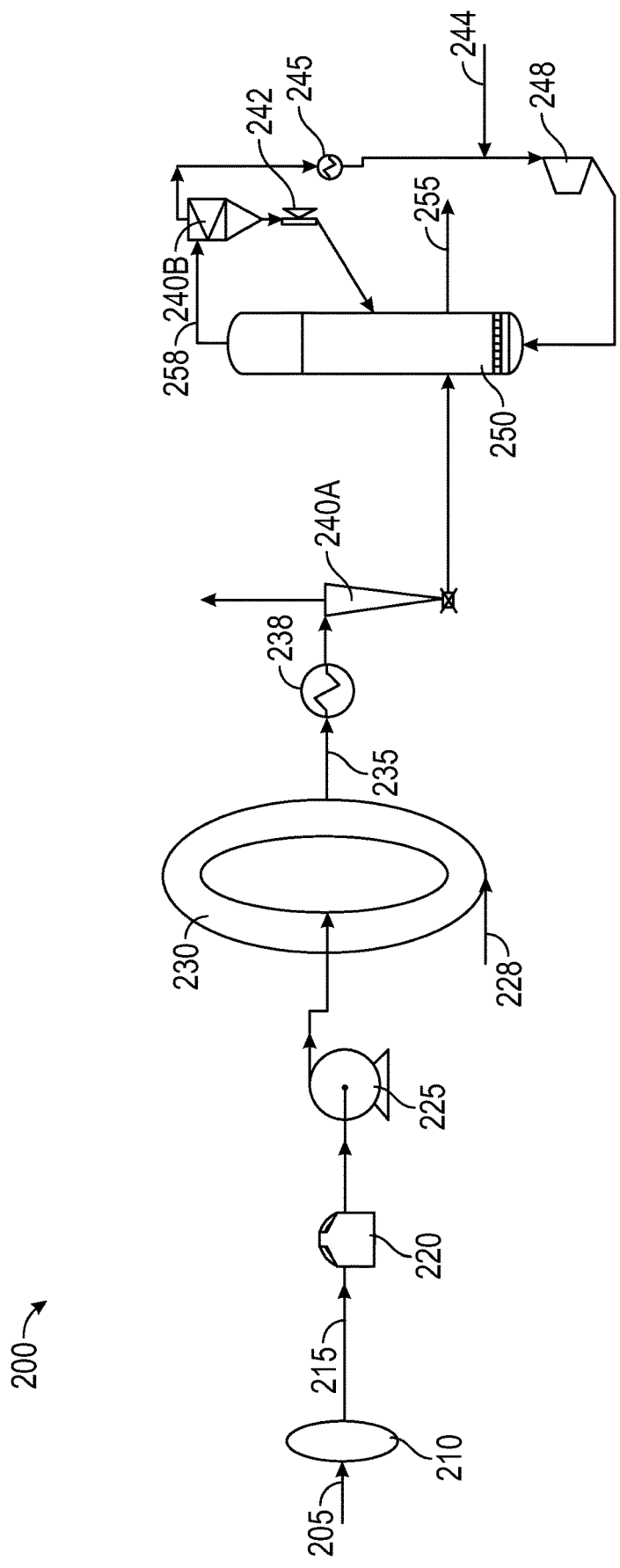
FIG. 2 illustrates a polymerization reactor system consistent with another aspect of the present invention.

Referring now to FIG. 2, which illustrates another polymerization reactor system 200 consistent with an aspect of the present invention. The system 200 can include a pre-polymerization reactor 210, a surge vessel 220, a feed pump 225, a loop reactor 230, a discharge line 235, a separator 240B, a fluidized bed reactor 250, and a fluidized bed reactor discharge 255, which are generally the same as described for the similarly numbered components in FIG. 1. The catalyst composition feed 205, pre-polymerized catalyst composition 215, reactant feed stream 228, eductor 242, heat exchanger 245, compressor 248, and overhead stream 258 exiting the fluidized bed reactor also can be generally the same as described for the similarly numbered components in FIG. 1.

The feed stream 244 in FIG. 2, which can supply additional ethylene, comonomer, hydrogen, inert gas and/or hydrocarbon into the fluidized bed reactor 250 is shown before the compressor 248 in FIG. 2, whereas the feed stream was after the compressor in FIG. 1. It is understood that there are many different methods and configurations in which components are fed—whether separately or together, and in any combination—to the fluidized bed reactor, and this disclosure is not limited solely to those options described in reference to FIGS. 1-2 or otherwise disclosed herein. FIG. 2 also shows the first reactor effluent in the discharge line 235, which can be heated 238 with a flashline heater if desired, entering separation vessel 240A, which has a continuous discharge of the intermediate material into the fluidized bed reactor 250, and an overhead stream leaving the separation vessel 240A, and the components in the overhead stream can be recycled within the system 200.

Figure 3:
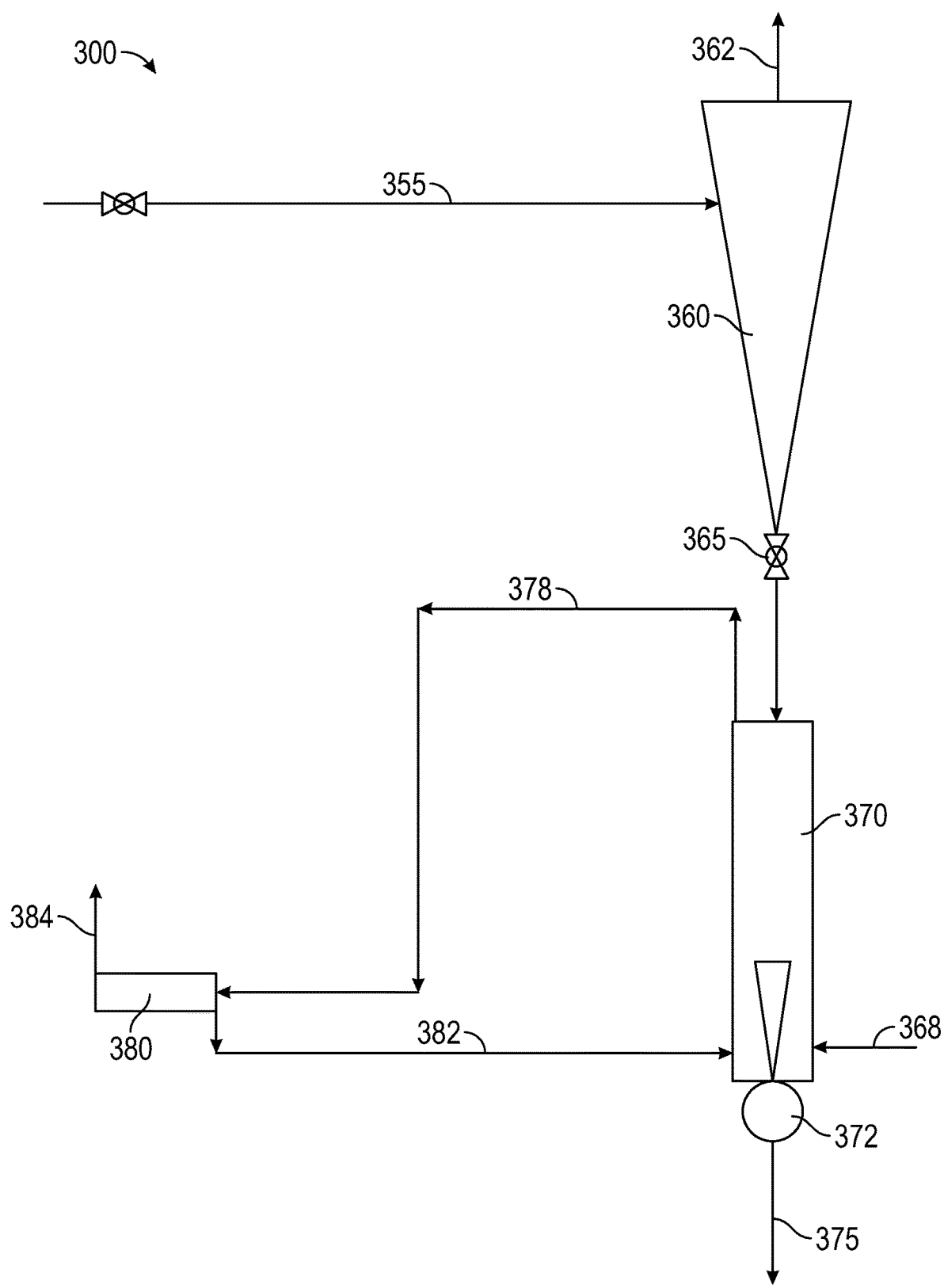
FIG. 3 illustrates a polymer recovery system that can be used in conjunction with the polymerization reactor systems of FIGS. 1-2.

FIG. 3 shows a polymer recovery system 300 that can be integrated into the reactor systems of FIGS. 1-2. The fluidized bed reactor discharge 355, which contains the multimodal ethylene polymer, can enter separation vessel 360 and flash gas 362 exits overhead and polymer is discharged through continuous fluff discharge 365 into a purge column 370, and contacted with nitrogen or other inert gas entering the purge column 370 through inert gas inlet 368. Multimodal ethylene polymer 375, with reduced volatile content, exits the purge column 370 through rotary valve 372. Also exiting the purge column are the inert gas, hydrocarbons and other volatiles through gas outlet 378, which then enter gas separator 380. The primary streams exiting the gas separator 380 are an inert gas recycle stream 382—which is reintroduced into the purge column 370—and a hydrocarbon/volatile stream 384.

The separation vessel 360 can be embodied as a flash tank, a flash vessel, a flash chamber, a cyclone, a high efficiency cyclone, or a centrifuge. A cyclone separator can be a hollow vessel having a conical shape. The top of the cyclone separator can have a diameter that is greater than a diameter of the bottom of the separator. In an aspect, the cone angle of the cyclone separator can be from 45° to 90°; alternatively, from 50° to 85°; alternatively, from 60° to 90°; alternatively, from 60° to 85°; alternatively, from 60° to 80°; alternatively, from 60° to 70°; or alternatively, from 70° to 80°. The cyclone separator can particularly be a high efficiency cyclone configured to separate 99 wt. % or more of the solid particles which have a size of from 2 to 10 microns from the gas mixture.

The angle with respect to horizontal of the end of the upper conduit than connects to the cyclone separator can be from 0° to 15°. In another aspect, a vertical distance h between the top of the separator and where the upper conduit connects to the separator can be from 0 m (0 ft) to 6.10 m (20 ft); alternatively, from 0.305 m (1 ft) to 3.048 m (10 ft); or alternatively, from 0.305 m (1 ft) to 1.52 m (5 ft). In an aspect, the cyclone separator is a tangential flow cyclone, and the inlet is a tangential inlet. The tangential inlet can have an entrance angle of from 0° to 15°; alternatively, from 7 to 11°, with respect to a tangent of the cyclone separator. Configuring the cyclone separator as a tangential flow cyclone separator can entail that the inlet is a tangential inlet. The tangential inlet can guide the mixture entering the cyclone separator toward the inner wall to promote separation of the solid particles from the gas mixture.

In another aspect, the tangential entrance velocity into the cyclone separator can be from 15.24 m/s (50 ft/sec) to 30.48 m/s (100 ft/sec); alternatively, from 18.29 m/s (60 ft/sec) to 27.43 m/s (90 ft/sec); or alternatively, from 21.34 m/s (70 ft/sec) to 24.39 m/s (80 ft/sec).

The continuous fluff discharge 365 can include a 2 to 8 inch ID v-ball valve, through which fluff can be continuously transferred out of the cyclone or other separation vessel 360. By maintaining a desired level of solid polymer particles in the cyclone zone, the polymer solids residence time, which is the average amount of time a polymer particle spends in the intermediate pressure zone, can be controlled. An increase in polymer solids residence time allows flashing and/or separating of more hydrocarbons/hydrogen, including more entrained diluent, from the polymer solids, thereby increasing the purity and processability of the polymer exiting the zone.

Furthermore, by maintaining a desired level of polymer solids in the cyclone, a pressure seal can be created between the zone and downstream equipment. In addition, operating and maintenance costs are reduced by providing a pressure seal between the cyclone and fluidized bed reactor that does not require the use of on/off valves.

Fluidly connected to the cyclone or other separation vessel 360, or as part of the cyclone, is a stripping section where lighter components (more volatile) are removed from the process. A stripping section removes one substance that might be dissolved in another by transfer from one phase to another. For a separator after the loop slurry reactor, the concentrations of hydrogen or hydrocarbons can be lowered before transfer to the fluidized bed reactor.

Minimizing hydrocarbon losses can be achieved my modifying the lower section of the purge column 370 to include comprise a zone for ethylene disengagement, a zone for nitrogen displacement, and a zone for final ethylene removal. The stripping gas entering the inert gas inlet 368 generally includes nitrogen and often can include a light hydrocarbon, such as treated or untreated ethylene. In another aspect, active flake discharged from the fluidized bed reactor can be used to remove poisons to produce polymerization grade ethylene without the use of upstream treaters. Optionally, a J purge ring can be use in the purge column to improve degassing efficiency and/or mass flow through the purge column.

A control scheme can be integrated into the polymer recovery system of FIG. 3 to adjust and control the amount of fresh nitrogen needed to degas the light hydrocarbon (ethylene). In an aspect, the hydrocarbon/volatile stream 384 can be recycled either to the loop reactor(s), the fluidized bed reactor(s), or any combination thereof.

Figure 5:
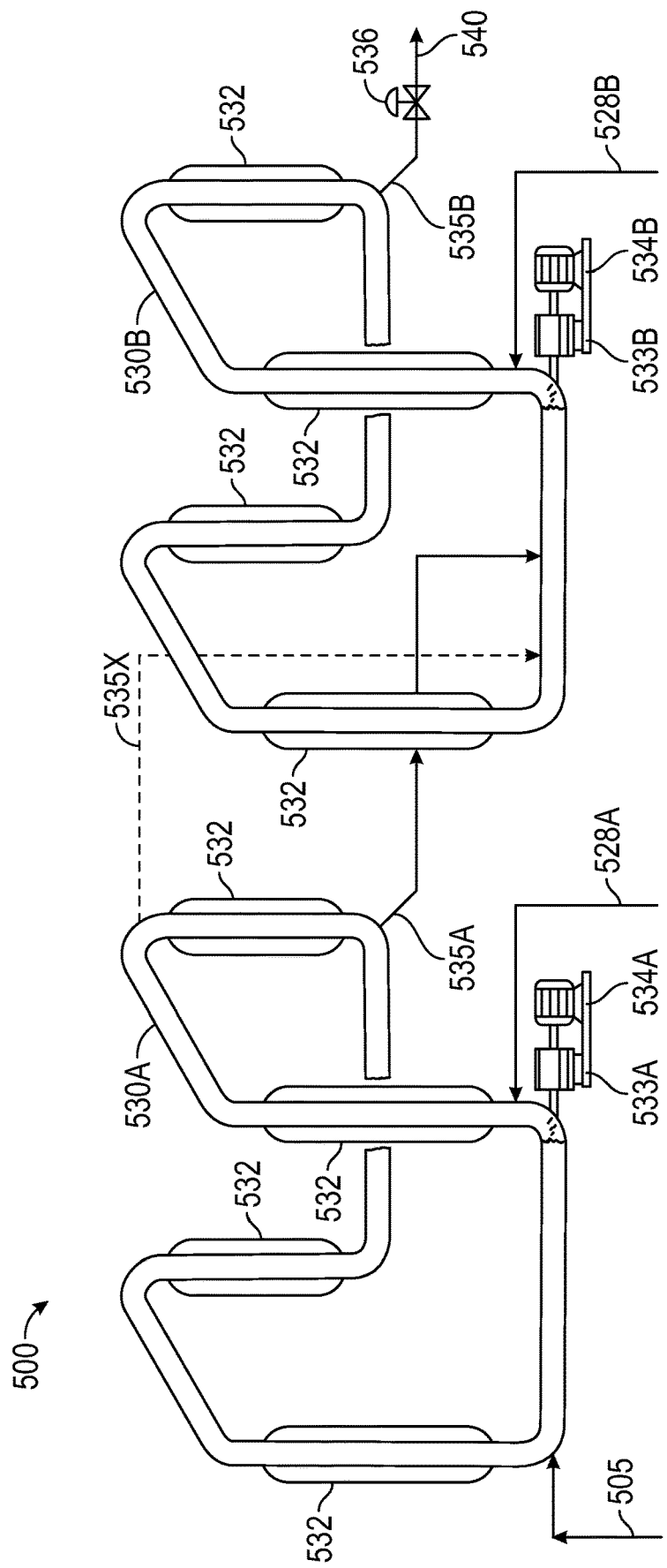
FIG. 5 illustrates a dual loop reactor configuration that can be integrated into the polymerization reactor systems of FIGS. 1-2.

FIG. 5 shows a dual loop reactor system 500 that can be integrated into the reactor systems of FIGS. 1-2. The system 500 includes a first loop reactor 530A and a second loop reactor 530B, and catalyst composition feed 505, first loop reactor feed stream 528A, second loop reactor feed stream 528B can be generally the same as described for the similarly numbered components in FIG. 1. A temperature control system for the loop reactors is collectively referred to by numeral 532. The loop reactors 530A-B each have a circulation pump 533A-B for circulating the slurries within the respective reactors, and an associated motor 534A-B. A discharge line 535A (or transfer line) from the first loop reactor 530A to the second loop reactor 530B is shown in FIG. 5, along with an optional second discharge/transfer line 535X. Any suitable discharge location(s) along the first loop reactor 530A and inlet location(s) along the second loop reactor 530B can be utilized. Reactor effluent from the second loop reactor 530B can be discharged in a second loop reactor discharge line 535B, through a continuous take-off valve 536, and fed to a separator device 540, which is described in greater detail in reference to FIGS. 1-2, prior to the resulting intermediate polymer material entering the fluidized bed reactor.

Figure 6:
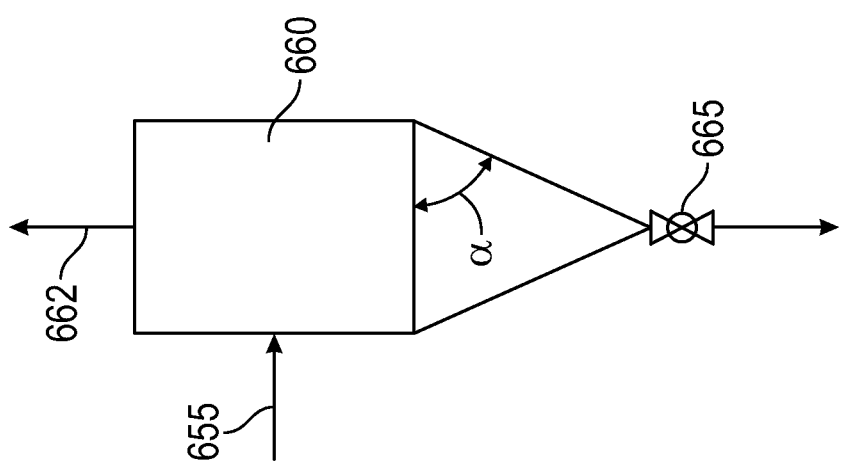
FIG. 6 illustrates a cyclone that can be utilized in any of the polymerization reactor systems and polymer recovery systems described herein.

FIG. 6 is a cyclone 660 that that can be utilized in any of the polymerization reactor systems and polymer recovery systems described herein. For instance, cyclone 660 can be used as separator 140B in FIG. 1, separation vessel 240A and/or separator 240B in FIG. 2, separation vessel 360 in FIG. 3, intermediate separations vessel 440 and/or final separations vessel 460 in FIG. 4, and separator device 540 in FIG. 5. In FIG. 6, the cone angle is represented by α

(alpha), and in some aspects, it is beneficial for the cone angle to range from 50° to 85°, from 60° to 85°, from 60° to 80°, from 60° to 70°, or from 70° to 80°. The cyclone 660 can have any of the features and characteristics described herein for any cyclone, high efficiency cyclone, or like separator device disclosed herein. FIG. 6 also is depicted as it may be incorporated directly into the polymer recovery system of FIG. 3, with fluidized bed reactor discharge 655 (which contains the multimodal ethylene polymer) entering the cyclone 660, flash gas 662 exiting overhead, and polymer discharging through continuous fluff discharge 665, which are generally the same as described for the similarly numbered components in FIG. 3.

Figure 7:
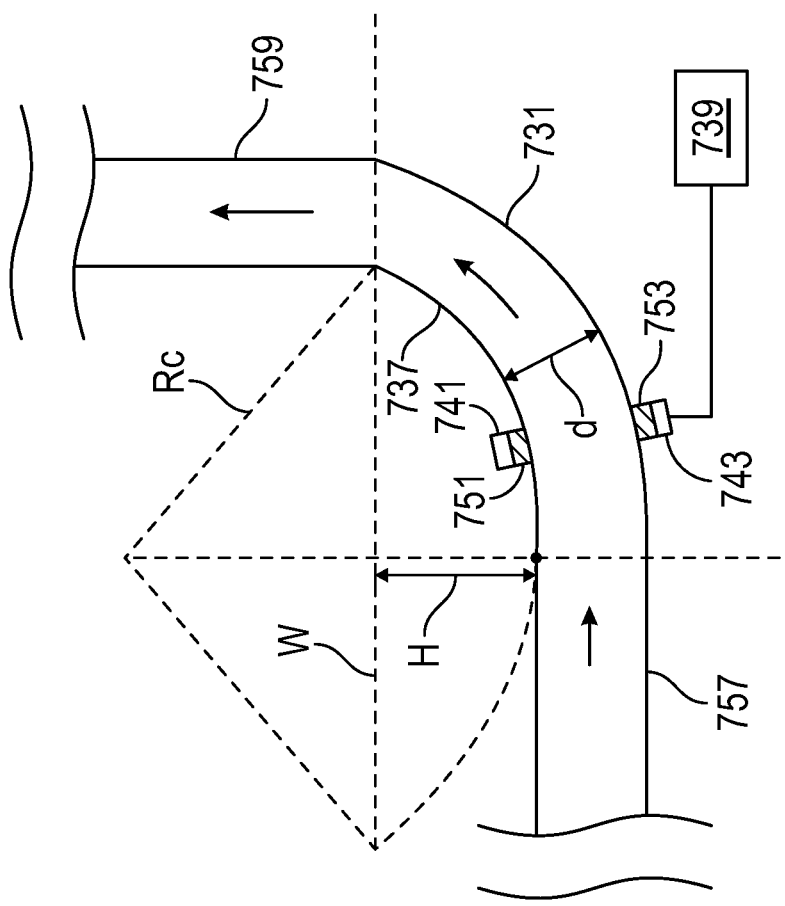
FIG. 7 illustrates an elbow section that can be integrated into any of the loop reactors and polymerization reactor systems described herein.

FIG. 7 is an elbow section 731 that can be integrated into any of the loop reactors and polymerization reactor systems described herein. For instance, elbow section 731 can be utilized in loop reactor 130 in FIG. 1, loop reactor 230 in FIG. 2, loop reactor 430 in FIG. 4, and first loop reactor 530A and/or second loop reactor 530B in FIG. 5. Each loop reactor disclosed herein has a plurality of elbow sections, at least of which can have an internal diameter (d) and a radius (Rc) of an inner curvature 737 shown in FIG. 7. The flow of loop reactor contents thru the elbow section 731 in FIG. 7 is indicated by the arrows from a horizontal section 757 to a vertical section 759 of the loop reactor. Two inner curvatures 737 of elbow section 731 can form an arc, with a height (H) measured from a midpoint of the arc. Each inner curvature 737 has a length, which is half of the chord length (W) of the arc (W/2). Thus, inner curvature 737 of the elbow section 731 in FIG. 7 has a length of W/2. Rc is the radius of curvature of the elbow section 731 and is equal to H/2+W$^2$/8H, where W is the chord length of the elbow section and H is the height of the elbow section.

The elbow section 731 of the loop reactor can include flow meter 739 (an elbow flow meter). For instance, an inner pressure tap 741 and an outer pressure tap 743 can be positioned about the inner and outer walls of the elbow section 731 to detect and measure a pressure differential between the inner and outer walls of the elbow section 731.

In a non-limiting example, the inner pressure tap 741 and the outer pressure tap 743 are flushed continuously with a diluent (e.g., isobutane, or in some cases, recycle isobutane) at a relatively high rate to prevent polymer slurry from plugging the components of the elbow flow meter 739. In another example, the inner pressure tap 741 and the outer pressure tap 743 can include an inner diaphragm 751 and an outer diaphragm 753, respectively, at the inner and outer walls of the elbow section 731, such that the inner pressure tap 741 and the outer pressure tap 743 can be protected from being plugged or fouled with polymer slurry. With the use of the inner diaphragm 751 and the outer diaphragm 753, a diluent flush may not be necessary. The elimination of the diluent flush can reduce the demand for an olefin-free diluent. Moreover, eliminating the diluent flush at the inner pressure tap 741 and the outer pressure tap 743 can generally improve the consistency of the pressure measurements obtained from the elbow flow meter 739.

The loop reactor maintains a high circulation velocity (V) and a high flow rate (e.g., a high Dean number ($D_n$)) for the circulating fluid slurry, especially within the elbow section 731. The circulation velocity (V) can be measured, for example, by the elbow flow meter 739 which can be coupled to the inner pressure tap 741 and the outer pressure tap 743 on the inner and outer walls, respectively, of the elbow section 731. In an aspect, the circulating velocity (V)—also referred to as linear velocity—of the slurry in the elbow section 731 can range from 10 to 60 ft/sec, and more often, from 15 to 55 ft/sec, from 20 to 50 ft/sec, or from 30 to 50 ft/sec. Additionally or alternatively, the Dean number of the slurry in the elbow section 731 is at least 4,000,000, at least 5,000,000, or at least 6,000,000, and often up to and including 10,000,000 to 15,000,000, or more. The Dean number is dimensionless, therefore, the parameters used to calculate the dimensionless Dean number must be converted to consistent units before making the calculation such that the units cancel each other out to result in the dimensionless number. As shown by the formula for Dean number—$D_n = (\rho V d/\mu)^* (d/2R_c)^{1/2}$—increasing circulating velocity (linear velocity) and decreasing radius of curvature (e.g., decreasing chord length) will increase the Dean number.

For example, a representative slurry having a set density and viscosity can have a Dean number of 4,916,000 in a loop reactor with d equal to 2 feet, Rc equal to 6 feet, and V equal to 32 ft/sec, but with an increase of V to 40 ft/sec, the Dean number increases to 6,145,000. As another example, a representative slurry having a set density and viscosity can have a Dean number of 4,609,000 in a loop reactor with d equal to 2 feet, Rc equal to 6 feet, and V equal to 30 ft/sec, but with a decrease in Rc to 1 ft, the Dean number increases to 11,290,000.

EXAMPLES

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

For the ethylene polymerization reactor systems of FIGS. 1-2, computer simulations were performed to determine the impact of propane content versus nitrogen content on the performance of the fluidized bed reactor, where the loop reactor is operated under supercritical propane polymerization conditions, and thus propane from the loop reactor can be introduced directly into the fluidized bed reactor. A summary of the results is shown in Table I.

Constructive Example 1 illustrates a base case in which a 0.918 density LLDPE (ethylene/1-hexene copolymer) is produced in a fluidized bed reactor using a typical Ziegler catalyst and using nitrogen as the inert gas/hydrocarbon. Constructive Examples 2-3 are simulations in which the same gas phase polymerization conditions are used and the same ethylene copolymer is produced, but different amounts of the nitrogen are displaced with propane as the inert gas or hydrocarbon. Constructive Example 3 utilizes propane and nitrogen, whereas Constructive Example 2 utilizes all propane.

For Constructive Example 2, all the nitrogen that is used in a typical fluidized bed reactor is replaced with propane by providing the catalyst feed to the fluidized bed reactor from the upstream loop reactor (utilizing propane as the diluent under supercritical conditions), and beneficially, the heat removal capability in the fluidized bed reactor is greatly increased. Propane appears to serve both as the inert gas/hydrocarbon and as the condensable agent in the fluidized bed reactor, when the propane concentration is high enough. Unexpectedly, Table I demonstrates that there is large increase in the condensation percentage and a 100% increase in overall production rate—there is a tremendous improvement in heat removal efficiency in the fluidized bed reactor. Further, the reactor inlet temperature can be increased. Other anticipated benefits include less cohesive polymer fluff/powder (less sheeting in the fluidized bed reactor and better flowability during downstream volatile removal) and improved hydrocarbon efficiencies during degassing.

Other computer simulations indicate that ethane would not be as good as propane because ethane does not provide the same amount of heat sink. Likewise, different butanes would not be as good as propane because they sorb into the polymer powder/fluff and thus would negatively impact powder flowability and reactor stability.

Thus, in an aspect of this invention, the gas composition in any fluidized bed reactor disclosed herein (inclusive of reactants such as ethylene, comonomer (if used), and hydrogen (if used)) can contain less than or equal to 20 mol % nitrogen, less than or equal to 15 mol % nitrogen, less than or equal to 10 mol % nitrogen, less than or equal to 5 mol %, less than or equal to 2 mol % nitrogen, less than or equal to 1 mol % nitrogen, or less than or equal to 0.5 mol % nitrogen. Additionally or alternatively, the gas composition in the fluidized bed reactor can contain at least 20 mol %, at least 30 mol %, at least 40 mol %, or at least 50 mol % propane, and often up to 75 mol %, 70 mol %, 65 mol %, or 60 mol % propane. Additional or alternatively, the molar ratio of nitrogen:propane can be less than or equal to 1:1, less than or equal to 0.75:1, less than or equal to 0.5:1, less than or equal to 0.4:1, less than or equal to 0.3:1, less than or equal to 0.2:1, less than or equal to 0.1:1, less than or equal to 0.05:1, less than or equal to 0.02:1, or less than or equal to 0.01:1. Additionally or alternatively, the gas phase polymerization conditions in the fluidized bed reactor can be characterized by a condensation percentage that ranges from 7 to 50 wt. %, from 7 to 30 wt. %, from 12 to 30 wt. %, from 15 to 30 wt. %, from 17 to 30 wt. %, from 20 to 30 wt. %, from 12 to 25 wt. %, from 15 to 25 wt. %, from 17 to 25 wt. %, or from 20 to 25 wt. %. Condensation percentage (wt. %) is ratio of the flow rate (e.g., lb/hr) of liquids entering the fluidized bed reactor (at the prevailing reactor inlet conditions, e.g., reactor inlet temperature and reactor pressure) to the total flow rate entering the fluidized bed reactor, and this include all feed streams, whether fresh or recycle. Typical components which are normally gaseous components under gas phase polymerization conditions include hydrogen, ethylene, ethane, and nitrogen. In contrast, propane and 1-hexene are condensable under gas phase polymerization conditions. As the relative amount of propane versus nitrogen increases, the condensation wt. % increases (at equivalent temperature and pressure conditions).

TABLE I

|  | Example 1 | Example 2 | Example 3 |
|---|---|---|---|
| Catalyst | Ziegler | Ziegler | Ziegler |
| Comonomer | 1-Hexene | 1-Hexene | 1-Hexene |
| Inert Gas | Nitrogen | C3 | C3 |
| Condensable Agent | n-C5 | C3 | C3 |
| Density, g/cc | 0.918 | 0.918 | 0.918 |
| Reactor Pressure, psig | 325 | 325 | 325 |
| Reactor Temperature, ° F. | 190 | 190 | 190 |
| Reactor Inlet Temperature, ° F. | 100 | 120 | 110 |
| Gas Composition |  |  |  |
| Hydrogen, mol % | 5.2% | 5.2% | 5.2% |
| Ethylene, mol % | 26.5% | 26.5% | 26.5% |
| Ethane, mol % | 2.5% | 2.5% | 2.5% |
| Propane, mol % | 0.0% | 61.4% | 51.4% |
| Butene, mol % | 0.0% | 0.0% | 0.0% |
| Butane, mol % | 0.0% | 0.0% | 0.0% |
| n-Pentane, mol % | 5.0% | 0.0% | 0.0% |

TABLE I-continued

|  | Example 1 | Example 2 | Example 3 |
|---|---|---|---|
| 1-Hexene, mol % | 4.0% | 4.0% | 4.0% |
| 2-Hexene, mol % | 0.3% | 0.3% | 0.3% |
| n-Hexane, mol % | 0.2% | 0.2% | 0.2% |
| Nitrogen | 56.4% | 0.0% | 10.0% |
| C6/C2, mole ratio | 0.15 | 0.15 | 0.15 |
| C4/C2, mole ratio | 0.00 | 0.00 | 0.00 |
| P/P* (related to sorption) | 0.78 | 0.51 | 0.51 |
| Total Sorbed Hydrocarbons, lbs/lb PE | 8% | 4% | 4% |
| Fluidization Velocity, ft/sec | 2.2 | 2.2 | 2.2 |
| Dewpoint, ° F. | 153 | 161 | 154 |
| Condensation, wt. % | 6.5 | 24.6 | 17.2 |
| Rate, lbs/hr | 70,214 | 148,446 | 123,650 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A process for producing a multimodal ethylene polymer, the process comprising:
(i) contacting a catalyst composition with ethylene, an optional first olefin comonomer, and hydrogen in an inert hydrocarbon diluent in a loop reactor under slurry or supercritical polymerization conditions to produce a first ethylene polymer;
(ii) discharging a first reactor effluent containing the first ethylene polymer from the loop reactor;
(iii) separating a light fraction comprising hydrogen from the first reactor effluent to form an intermediate material; and
(iv) contacting the intermediate material with ethylene and an optional second olefin comonomer in an inert gas and/or hydrocarbon in a fluidized bed reactor under gas phase polymerization conditions to produce the multimodal ethylene polymer.

Aspect 2. The process defined in aspect 1, wherein hydrogen is present in step (iv).

Aspect 3. The process defined in aspect 1 or 2, wherein the first olefin comonomer is present in step (i), or the second olefin comonomer is present in step (iv), or both.

Aspect 4. A process for producing a multimodal ethylene polymer, the process comprising:
(i) contacting a catalyst composition with ethylene, an optional first olefin comonomer, and optional hydrogen in an inert hydrocarbon diluent in a first loop reactor under slurry or supercritical polymerization conditions to produce a first ethylene polymer;
(ii) discharging a first reactor effluent containing the first ethylene polymer from the first loop reactor and introducing the first reactor effluent into a second loop reactor;
(iii) contacting the first reactor effluent with ethylene, an optional second olefin comonomer, and optional hydrogen in the second loop reactor under slurry or supercritical polymerization conditions to produce a second ethylene polymer;
(iv) discharging a second reactor effluent containing the second ethylene polymer from the second loop reactor;
(v) separating a light fraction comprising hydrogen from the second reactor effluent to form an intermediate material, wherein hydrogen is present in step (i), or step (iii), or both; and (vi) contacting the intermediate material with ethylene and an optional third olefin comonomer in an inert gas and/or hydrocarbon in a fluidized bed reactor under gas phase polymerization conditions to produce the multimodal ethylene polymer.

Aspect 5. The process defined in aspect 4, wherein hydrogen is present in step (i) or step (iii).

Aspect 6. The process defined in aspect 4 or 5, wherein the first olefin comonomer is present in step (i), or the second olefin comonomer is present in step (iii), or the third olefin comonomer is present in step (vi), or any combination thereof.

Aspect 7. A process for producing a multimodal ethylene polymer, the process comprising:
(i) contacting a catalyst composition with ethylene and an optional first olefin comonomer in an inert gas and/or hydrocarbon in a fluidized bed reactor under gas phase polymerization conditions to produce a first ethylene polymer;
(ii) discharging a first reactor effluent containing the first ethylene polymer from the fluidized bed reactor;
(iii) combining an inert hydrocarbon diluent with the first reactor effluent and increasing the pressure to form an intermediate material; and
(iv) contacting the intermediate material with ethylene and an optional second olefin comonomer in the loop reactor under slurry or supercritical polymerization conditions to produce the multimodal ethylene polymer.

Aspect 8. The process defined in aspect 7, wherein hydrogen is present in step (i), or step (iv), or both.

Aspect 9. The process defined in aspect 7 or 8, wherein the first olefin comonomer is present in step (i), or the second olefin comonomer is present in step (iv), or both.

Aspect 10. A process for producing a multimodal ethylene polymer, the process comprising:
(i) contacting a first catalyst composition with ethylene and an optional first olefin comonomer in an inert hydrocarbon diluent in a loop reactor under slurry or supercritical polymerization conditions to produce a first ethylene polymer;
(ii) contacting a second catalyst composition with ethylene and an optional second olefin comonomer in an inert gas and/or hydrocarbon in a fluidized bed reactor under gas phase polymerization conditions to produce a second ethylene polymer; and
(iii) combining the first ethylene polymer and the second ethylene polymer to produce the multimodal ethylene polymer.

Aspect 11. The process defined in aspect 10, wherein hydrogen is present in step (i), or step (ii), or both.

Aspect 12. The process defined in aspect 10 or 11, wherein the first olefin comonomer is present in step (i), or the second olefin comonomer is present in step (ii), or both.

Aspect 13. The process defined in any one of aspects 1-12, wherein each catalyst composition independently is a metallocene catalyst system, a Ziegler-Natta catalyst system, a chromium catalyst system, a nickel catalyst system, or any combination thereof.

Aspect 14. The process defined in any one of aspects 1-13, wherein each catalyst composition is a Ziegler-Natta catalyst system.

Aspect 15. The process defined in any one of aspects 1-14, wherein each catalyst composition independently is a supported catalyst system comprising a transition metal (e.g., chromium, vanadium, titanium, zirconium, hafnium, or a combination thereof) supported on a suitable support (e.g., a solid oxide or a chemically-treated solid oxide).

Aspect 16. The process defined in any one of aspects 1-15, wherein each catalyst composition independently comprises an activator and/or co-catalyst, e.g., an aluminoxane compound, an organoboron or organoborate compound, an organoaluminum compound, an organozinc compound, or any combination thereof.

Aspect 17. The process defined in any one of aspects 1-16, wherein each olefin comonomer independently comprises propylene, 1-butene, 1-pentene, 4-methyl-1-pentene, 1-hexene, 1-octene, or a mixture thereof.

Aspect 18. The process defined in any one of aspects 1-17, wherein each ethylene polymer independently comprises an ethylene homopolymer and/or an ethylene/α-olefin copolymer.

Aspect 19. The process defined in any one of aspects 1-18, wherein each ethylene polymer independently comprises an ethylene homopolymer, an ethylene/1-butene copolymer, an ethylene/1-hexene copolymer, and/or an ethylene/1-octene copolymer.

Aspect 20. The process defined in any one of aspects 1-19, wherein each ethylene polymer independently comprises an ethylene/α-olefin copolymer and/or an ethylene terpolymer (e.g., ethylene with 1-butene and 1-hexene).

Aspect 21. The process defined in any one of aspects 1-20, wherein the inert hydrocarbon diluent comprises propane, isobutane, n-butane, n-pentane, isopentane, neopentane, cyclohexane, n-hexane, heptane, cycloheptane, octane, or any combination thereof.

Aspect 22. The process defined in any one of aspects 1-21, wherein slurry polymerization conditions comprise polymerization conditions in which the inert hydrocarbon diluent is a liquid.

Aspect 23. The process defined in any one of aspects 1-21, wherein supercritical polymerization conditions comprise polymerization conditions in which polymerization temperature and pressure are above the critical points.

Aspect 24. The process defined in any one of aspects 1-23, wherein slurry or supercritical polymerization conditions comprise a polymerization temperature in a range from 40° C. to 130° C., from 60° C. to 120° C., or from 75° C. to 115° C.

Aspect 25. The process defined in any one of aspects 1-24, wherein slurry or supercritical polymerization conditions comprise a polymerization pressure in a range from 200 to 1500 psig, from 400 to 1200 psig, from 450 to 850 psig, or from 900 to 1100 psig.

Aspect 26. The process defined in any one of aspects 1-25, wherein each loop reactor is configured independently for a maximum allowed working pressure (MAWP) of the respective reactor that is greater than, at least 5% greater than, and/or up to 30% greater than, the polymerization pressure.

Aspect 27. The process defined in any one of aspects 4-6 or 13-26, wherein a first polymerization pressure in the first loop reactor and a second polymerization pressure in the second loop reactor are within 25%, within 20%, within 10%, or within 5%, of each other.

Aspect 28. The process defined in any one of aspects 1-27, wherein slurry or supercritical polymerization conditions comprise an average residence time from 10 to 90 min, from 15 to 75 min, or from 20 to 60 min.

Aspect 29. The process defined in any one of aspects 1-28, wherein slurry or supercritical polymerization conditions comprise a linear velocity from 10 to 60 ft/sec, from 15 to 55 ft/sec, or from 20 to 50 ft/sec.

Aspect 30. The process defined in any one of aspects 1-29, further comprising a step of pre-polymerizing in a pre-polymerization reactor (e.g., loop reactor design) prior to step (i).

Aspect 31. The process defined in any one of aspects 1-30, further comprising a step of polymerizing in a second fluidized bed reactor under gas phase polymerization conditions.

Aspect 32. The process defined in any one of aspects 1-31, wherein each loop reactor independently produces a polymer having a lower Mw, a higher MI, and higher density than that produced by the fluidized bed reactor (higher Mw, lower MI, and lower density).

Aspect 33. The process defined in any one of aspects 1-31, wherein each loop reactor independently produces a polymer having a higher Mw, lower MI, and lower density than that produced by the fluidized bed reactor (lower Mw, higher MI, and higher density).

Aspect 34. The process defined in any one of aspects 1-33, wherein at least one contacting step (or each contacting step) further comprises contacting with an antistatic compound.

Aspect 35. The process defined in any one of aspects 1-3 or 7-34, wherein from 20 to 90 wt. % of the multimodal ethylene polymer is produced in the loop reactor and from 10 to 80 wt. % of the multimodal ethylene polymer is produced in the fluidized bed reactor.

Aspect 36. The process defined in any one of aspects 4-6 or 13-34, wherein from 5 to 30 wt. % of the multimodal ethylene polymer is produced in the first loop reactor, from 30 to 60 wt. % of the multimodal ethylene polymer is produced in the second loop reactor, and from 30 to 60 wt. % of the multimodal ethylene polymer is produced in the fluidized bed reactor.

Aspect 37. The process defined in any one of aspects 1-36, wherein the multimodal ethylene polymer has any suitable fluff or powder properties, e.g., bulk density, average particle size, particle size distribution, span, etc.

Aspect 38. The process defined in any one of aspects 1-37, wherein each loop reactor independently has a length/diameter (L/D) ratio from 500 to 3,000, or from 700 to 1,500.

Aspect 39. The process defined in any one of aspects 1-38, wherein each loop reactor independently has an inside diameter from to 12 to 48 inches, from 18 to 40 inches, or from 20 to 32 inches.

Aspect 40. The process defined in any one of aspects 1-39, wherein each loop reactor independently has a length from 50 to 300 feet, or from 100 to 250 feet, and with from 2 to 16 legs, or from 4 to 14 legs.

Aspect 41. The process defined in any one of aspects 1-40, wherein each loop reactor independently comprises an elbow section (or two or more elbow sections) configured to maintain a Dean number ($D_n$) of the reaction mixture flowing therein to be at least 3,000,000 (e.g., at least 4,000,000, at least 5,000,000, or at least 6,000,000, and less than or equal to 15,000,000 or less than or equal to 10,000,000).

Aspect 42. The process defined in any one of aspects 1-41, wherein each loop reactor independently has an inner surface with a surface roughness of less than or equal to 150, less than or equal to 100, or less than or equal to 50 microinches, e.g., from 10 to 50 microinches.

Aspect 43. The process defined in any one of aspects 1-42, wherein each loop reactor independently is constructed of carbon steel, stainless steel, low temperature carbon steel, or a combination thereof.

Aspect 44. The process defined in any one of aspects 1-43, wherein each loop reactor is constructed of a rolled plate having two edges joined along a seam.

Aspect 45. The process defined in any one of aspects 1-44, wherein each loop reactor comprises an elbow flow meter.

Aspect 46. The process defined in any one of aspects 1-45, wherein each loop reactor comprises a rust inhibitor coating on reactor surfaces and flanges.

Aspect 47. The process defined in any one of aspects 1-46, wherein the slurry or supercritical polymerization conditions comprise a Froude number from 10 to 100, from 15 to 50, from 20 to 90, or from 40 to 80.

Aspect 48. The process defined in any one of aspects 1-47, wherein the slurry or supercritical polymerization conditions comprise a Biot number of less than or equal to 3, less than or equal to 2, less than or equal to 1.5, or less than or equal to 1.1.

Aspect 49. The process defined in any one of aspects 1-48, wherein the slurry or supercritical polymerization conditions comprise a cavitation number (Ca) of from 6 to 60, from 12 to 50, from 18 to 40, or from 24 to 36.

Aspect 50. The process defined in any one of aspects 1-49, wherein the slurry or supercritical polymerization conditions comprise a Euler number of greater than or equal to 5, greater than or equal to 6, or greater than or equal to 7.

Aspect 51. The process defined in any one of aspects 1-50, wherein each reactor effluent is discharged from the respective loop reactor continuously.

Aspect 52. The process defined in any one of aspects 1-51, wherein each reactor effluent is discharged from the respective loop reactor continuously through a continuous take-off assembly comprising a valve, a v-ball valve, or no valve.

Aspect 53. The process defined in any one of aspects 4-6 or 13-52, wherein a discharge location(s) of the first loop reactor is at a location of higher pressure (downstream of the circulating pump) than a feed location(s) of the second loop reactor (upstream of the circulating pump).

Aspect 54. The process defined in any one of aspects 1-53, wherein each reactor effluent is discharged from the respective loop reactor into a discharge line comprising a flashline heater.

Aspect 55. The process defined in aspect 54, further comprising adding a catalyst deactivating agent (optionally) into the discharge line, e.g., water, oxygen, or an alcohol.

Aspect 56. The process defined in any one of aspects 1-55, further comprising adding a reaction moderating agent (optionally) to the first reactor effluent (or the second reactor effluent).

Aspect 57. The process defined in any one of aspects 1-56, wherein the step of separating comprises flashing.

Aspect 58. The process defined in any one of aspects 1-57, wherein the step of separating comprises the use of a cyclone.

Aspect 59. The process defined in any one of aspects 1-58, wherein each loop reactor comprises a reactor circulating pump (one or more than one).

Aspect 60. The process defined in any one of aspects 1-59, further comprising a step of introducing the catalyst composition to the loop reactor (or the first loop reactor) in a slurry at a solids content of from 1 to 15 wt. %, from 2 to 14 wt. %, or from 3 to 12 wt. %.

Aspect 61. The process defined in any one of aspects 1-60, wherein gas phase polymerization conditions comprise a polymerization temperature in a range from 48° C. to 95° C., from 50° C. to 85° C., or from 55° C. to 82° C.

Aspect 62. The process defined in any one of aspects 1-61, wherein gas phase polymerization conditions comprise a polymerization pressure in a range from 200 to 500 psig, from 200 to 400 psig, from 250 to 650 psig, or from 250 to 350 psig.

Aspect 63. The process defined in any one of aspects 1-62, wherein gas phase polymerization conditions comprise a fluidization velocity from 1.5 to 3 ft/sec, from 1.5 to 2.7 ft/sec, or from 1.7 to 2.7 ft/sec.

Aspect 64. The process defined in any one of aspects 1-63, wherein the inert gas and/or hydrocarbon comprises nitrogen, ethane, propane, or a combination thereof.

Aspect 65. The process defined in any one of aspects 1-64, wherein gas phase polymerization conditions further comprise contacting in the presence of a $C_3$-$C_8$ alkane or $C_4$-$C_8$ alkane condensable agent, e.g., butane (e.g., n-butane and/or isobutane), pentane (e.g., n-pentane and/or isopentane), hexane, or combinations thereof, at any amount up to 30 vol %, based on reactor contents (e.g., from 5 to 30 vol %, from 10 to 30 vol %, or from 15 to 25 vol %).

Aspect 66. The process defined in any one of aspects 1-65, wherein each ethylene polymer or reactor effluent is discharged from the respective fluidized bed reactor continuously.

Aspect 67. The process defined in any one of aspects 1-65, wherein each ethylene polymer or reactor effluent is discharged from the respective fluidized bed reactor through a lock hopper.

Aspect 68. The process defined in any one of aspects 1-67, further comprising determining and/or controlling bed height (level of solids) in the fluidized bed reactor.

Aspect 69. The process defined in any one of aspects 1-68, further comprising a step of separating fine polymer particles from unreacted olefins in a gas stream from the fluidized bed reactor, and conveying the fine polymer particles back to the fluidized bed reactor.

Aspect 70. The process defined in any one of aspects 1-69, further comprising determining and/or controlling a polymer property of each ethylene polymer using any suitable analytical technique, e.g., Raman spectroscopy for density, melt flow meter for MI and HLMI, a rheometer for rheological parameters, a GPC for MWD, etc.

Aspect 71. The process defined in any one of aspects 1-70, further comprising injecting a low level of deactivator downstream of the fluidized bed reactor to enhance properties (broaden MWD) and inhibit polymer growth.

Aspect 72. The process defined in any one of aspects 1-71, wherein each loop reactor is operated under supercritical conditions at a pressure $P4$ in a range from 900 to 1100 psig.

Aspect 73. The process defined in any one of aspects 1-72, wherein the step of separating is conducted in a separations vessel operating at a pressure $P5$ in a range from 150 to 800 psig and/or under conditions sufficient to remove at least 80 wt. %, at least 90 wt. %, or at least 95 wt. % hydrogen, from the respective reactor effluent.

Aspect 74. The process defined in aspect 72 or 73, wherein a ratio of $P4/P5$ is in a range from 3 to 6, from 3 to 5.5, from 3.5 to 6, or from 3.5 to 5.5.

Aspect 75. The process defined in any one of aspects 1-74, wherein the fluidized bed reactor is operated at a pressure $P6$ in a range from 250 to 600 psig.

Aspect 76. The process defined in any one of aspects 1-75, wherein a discharge stream from the fluidized bed reactor containing the multimodal ethylene polymer is introduced into a separations vessel operating at a pressure $P7$ in a range from 5 to 200 psig and/or under conditions sufficient to remove at least 60 wt. %, at least 70 wt. %, at least 80 wt. %, or at least 90 wt. % of the propane from the discharge stream.

Aspect 77. The process defined in aspect 76, further comprising discharging the multimodal ethylene polymer from the separations vessel into a purge column operating at a pressure $P8$ in a range from 1 to 20 psig.

Aspect 78. The process defined in aspect 76 or 77, wherein a ratio of $P6/P7$ is greater than a ratio of $P4/P5$.

Aspect 79. The process defined in any one of aspects 76-78, wherein a ratio of $P5/P7$ is in range from 4 to 60, or from 5 to 55, or from 10 to 40.

Aspect 80. The process defined in any one of aspects 30-79, wherein the step of pre-polymerizing is conducted in a pre-polymerization reactor (e.g., loop reactor design) at a pressure $P1$ in a range from 900 to 1200 psig and/or at a pressure greater than $P4$ ($P1>P4$).

Aspect 81. The process defined in any one of aspects 30-79, wherein the step of pre-polymerizing is conducted in a pre-polymerization reactor (e.g., loop reactor design) at a pressure $P1$ in a range from 400 to 800 psig.

Aspect 82. The process defined in aspect 81, wherein a discharge stream from the pre-polymerization reactor is introduced into a surge vessel operating at a pressure $P2$ in a range from 400 to 800 psig and/or at a pressure less than $P1$ ($P2<P1$).

Aspect 83. The process defined in aspect 82, wherein a discharge stream from the surge vessel is introduced into a feed pump to increase a discharge pressure $P3$ from the pump to a range of 925 to 1200 psig.

Aspect 84. A polymerization reactor system (reactor apparatus) for producing a multimodal ethylene polymer, the system comprising:
 (a) a loop reactor configured to contact a catalyst composition with ethylene, an optional first olefin comonomer, and hydrogen in an inert hydrocarbon diluent under slurry or supercritical polymerization conditions to produce a first ethylene polymer;
 (b) a discharge line configured to withdraw a first reactor effluent containing the first ethylene polymer from the loop reactor;
 (c) a separator configured to remove a light fraction comprising hydrogen from the first reactor effluent to form an intermediate material; and
 (d) a fluidized bed reactor configured to contact the intermediate material with ethylene and an optional second olefin comonomer in an inert gas and/or hydrocarbon under gas phase polymerization conditions to produce the multimodal ethylene polymer.

Aspect 85. The system defined in aspect 84, wherein the fluidized bed reactor is further configured to contact hydrogen with the intermediate material, ethylene, and the optional second olefin comonomer.

Aspect 86. The system defined in aspect 84 or 85, wherein:
 the loop reactor is configured to contact the catalyst composition with ethylene, the first olefin comonomer, and hydrogen; or
 the fluidized bed reactor is configured to contact the intermediate material with ethylene and the second olefin comonomer; or
 both.

Aspect 87. A polymerization reactor system for producing a multimodal ethylene polymer, the system comprising:
 (a) a first loop reactor configured to contact a catalyst composition with ethylene, an optional first olefin comonomer, and optional hydrogen in an inert hydrocarbon diluent under slurry or supercritical polymerization conditions to produce a first ethylene polymer;

(b) a second loop reactor configured to contact a first reactor effluent containing the first ethylene polymer with ethylene, an optional second olefin comonomer, and optional hydrogen under slurry or supercritical polymerization conditions to produce a second ethylene polymer;

(c) a transfer line configured to withdraw the first reactor effluent containing the first ethylene polymer from the first loop reactor and to introduce the first reactor effluent into the second loop reactor;

(d) a second discharge line configured to withdraw a second reactor effluent containing the second ethylene polymer from the second loop reactor;

(e) a separator configured to remove a light fraction comprising hydrogen from the second reactor effluent to form an intermediate material, wherein hydrogen is present in the first loop reactor, the second loop reactor, or both; and (f) a fluidized bed reactor configured to contact the intermediate material with ethylene and an optional third olefin comonomer in an inert gas and/or hydrocarbon under gas phase polymerization conditions to produce the multimodal ethylene polymer.

Aspect 88. The system defined in aspect 87, wherein:
the first loop reactor is configured to contact the catalyst composition with ethylene, an optional first olefin comonomer, and hydrogen; or
the second loop reactor is configured to contact the first reactor effluent with ethylene, an optional second olefin comonomer, and hydrogen.

Aspect 89. The system defined in aspect 84 or 85, wherein:
the first loop reactor is configured to contact the catalyst composition with ethylene and the first olefin comonomer, or
the second loop reactor is configured to contact the first reactor effluent with ethylene and the second olefin comonomer; or
the fluidized bed reactor is configured to contact the intermediate material with ethylene and the third olefin comonomer; or
any combination thereof.

Aspect 90. A polymerization reactor system for producing a multimodal ethylene polymer, the system comprising:
(a) a fluidized bed reactor configured to contact a catalyst composition with ethylene and an optional first olefin comonomer in an inert gas and/or hydrocarbon under gas phase polymerization conditions to produce a first ethylene polymer;
(b) a discharge line configured to withdraw a first reactor effluent containing the first ethylene polymer from the fluidized bed reactor;
(c) a transfer line configured to combine an inert hydrocarbon diluent with the first reactor effluent and to increase pressure to form an intermediate material; and
(d) a loop reactor configured to contact the intermediate material with ethylene and an optional second olefin comonomer under slurry or supercritical polymerization conditions to produce the multimodal ethylene polymer.

Aspect 91. The system defined in aspect 90, wherein:
the fluidized bed reactor is further configured to contact the catalyst composition with ethylene, the optional first olefin comonomer, and hydrogen; or
the loop reactor is further configured to contact the intermediate material with ethylene, the optional second olefin comonomer, and hydrogen; or
both.

Aspect 92. The system defined in aspect 90 or 91, wherein:
the fluidized bed reactor is configured to contact the catalyst composition with ethylene and the first olefin comonomer; or
the loop reactor is configured to contact the intermediate material with ethylene and the second olefin comonomer; or
both.

Aspect 93. A polymerization reactor system for producing a multimodal ethylene polymer, the system comprising:
(a) a loop reactor configured to contact a catalyst composition with ethylene and an optional first olefin comonomer in an inert hydrocarbon diluent under slurry or supercritical polymerization conditions to produce a first ethylene polymer;
(b) a fluidized bed reactor configured to contact a second catalyst composition with ethylene and an optional second olefin comonomer in an inert gas and/or hydrocarbon under gas phase polymerization conditions to produce a second ethylene polymer; and
(c) a mixing device configured to combine the first ethylene polymer and the second ethylene polymer to produce the multimodal ethylene polymer.

Aspect 94. The system defined in aspect 93, wherein:
the loop reactor is further configured to contact the catalyst composition with ethylene, the optional first olefin comonomer, and hydrogen; or
the fluidized bed reactor is further configured to contact the second catalyst composition with ethylene, the optional second olefin comonomer, and hydrogen; or
both.

Aspect 95. The system defined in aspect 93 or 94, wherein:
the loop reactor is configured to contact the catalyst composition with ethylene and the first olefin comonomer; or
the fluidized bed reactor is configured to contact the second catalyst composition with ethylene and the second olefin comonomer; or
both.

Aspect 96. The system defined in any one of aspects 84-95, wherein the system further comprises a second fluidized bed reactor configured to operate under gas phase polymerization conditions.

Aspect 97. The system defined in any one of aspects 84-96, wherein the system further comprises a pre-polymerization reactor (e.g., loop reactor design).

Aspect 98. The system defined in any one of aspects 84-97, wherein each loop reactor is configured independently for any polymerization temperature, polymerization pressure, average residence time, and linear velocity disclosed herein.

Aspect 99. The system defined in any one of aspects 84-98, wherein each loop reactor is configured independently for a maximum allowed working pressure (MAWP) of the respective reactor that is greater than, at least 5% greater than, and/or up to 30% greater than, the polymerization pressure.

Aspect 100. The system defined in any one of aspects 87-89 or 96-99, wherein the first loop reactor and the second loop reactor are configured for polymerization pressures that are within 25%, within 20%, within 10%, or within 5%, of each other.

Aspect 101. The system defined in any one of aspects 84-100, wherein each loop reactor is configured to independently produce a polymer having a lower Mw, a higher MI, and higher density than that produced by the fluidized bed reactor (higher Mw, lower MI, and lower density).

Aspect 102. The system defined in any one of aspects 84-100, wherein each loop reactor is configured to independently produce a polymer having a higher Mw, lower MI, and lower density than that produced by the fluidized bed reactor (lower Mw, higher MI, and higher density).

Aspect 103. The system defined in any one of aspects 84-102, wherein the system is further configured to introduce an antistatic compound into at least one loop reactor or fluidized bed reactor.

Aspect 104. The system defined in any one of aspects 84-86 or 90-103, wherein the system is configured to produce from 20 to 90 wt. % of the multimodal ethylene polymer in the loop reactor and from 10 to 80 wt. % of the multimodal ethylene polymer in the fluidized bed reactor.

Aspect 105. The system defined in any one of aspects 87-89 or 96-103, wherein the system is configured to produce from 5 to 30 wt. % of the multimodal ethylene polymer in the first loop reactor, from 30 to 60 wt. % of the multimodal ethylene polymer in the second loop reactor, and from 30 to 60 wt. % of the multimodal ethylene polymer in the fluidized bed reactor.

Aspect 106. The system defined in any one of aspects 84-105, wherein each loop reactor independently has a length/diameter (L/D) ratio from 500 to 3,000, or from 700 to 1,500.

Aspect 107. The system defined in any one of aspects 84-106, wherein each loop reactor independently has an inside diameter from to 12 to 48 inches, from 18 to 40 inches, or from 20 to 32 inches.

Aspect 108. The system defined in any one of aspects 84-107, wherein each loop reactor independently has a length from 50 to 300 feet, or from 100 to 250 feet, and with from 2 to 16 legs, or from 4 to 14 legs.

Aspect 109. The system defined in any one of aspects 84-108, wherein each loop reactor independently comprises an elbow section (or two or more elbow sections) configured to maintain a Dean number ($D_n$) of the reaction mixture flowing therein to be at least 3,000,000 (e.g., at least 4,000,000, at least 5,000,000, or at least 6,000,000, and less than or equal to 15,000,000 or less than or equal to 10,000,000).

Aspect 110. The system defined in any one of aspects 84-109, wherein each loop reactor independently has an inner surface with a surface roughness of less than or equal to 150, less than or equal to 100, or less than or equal to 50 microinches, e.g., from 10 to 50 microinches.

Aspect 111. The system defined in any one of aspects 84-110, wherein each loop reactor independently is constructed of carbon steel, stainless steel, low temperature carbon steel, or a combination thereof.

Aspect 112. The system defined in any one of aspects 84-111, wherein each loop reactor is constructed of a rolled plate having two edges joined along a seam.

Aspect 113. The system defined in any one of aspects 84-112, wherein each loop reactor comprises an elbow flow meter.

Aspect 114. The system defined in any one of aspects 84-113, wherein each loop reactor comprises a rust inhibitor coating on reactor surfaces and flanges.

Aspect 115. The system defined in any one of aspects 84-114, wherein each loop reactor is configured to maintain a Froude number from 10 to 100, from 15 to 50, from 20 to 90, or from 40 to 80.

Aspect 116. The system defined in any one of aspects 84-115, wherein each loop reactor is configured to maintain a Biot number of less than or equal to 3, less than or equal to 2, less than or equal to 1.5, or less than or equal to 1.1.

Aspect 117. The system defined in any one of aspects 84-116, wherein each loop reactor is configured to maintain a cavitation number (Ca) of from 6 to 60, from 12 to 50, from 18 to 40, or from 24 to 36.

Aspect 118. The system defined in any one of aspects 84-117, wherein each loop slurry reactor is configured to maintain a Euler number of greater than or equal to 5, greater than or equal to 6, or greater than or equal to 7.

Aspect 119. The system defined in any one of aspects 84-118, wherein each loop reactor is configured to discharge continuously (has a continuous take-off assembly).

Aspect 120. The system defined in any one of aspects 84-119, wherein each loop reactor is configured to discharge continuously through a continuous take-off assembly comprising a valve, a v-ball valve, or no valve (has a continuous take-off assembly comprising a valve, a v-ball valve, or no valve).

Aspect 121. The system defined in any one of aspects 87-89 or 96-120, wherein the first loop reactor has a discharge location(s) at a higher pressure (downstream of the circulating pump) than a feed location(s) of the second loop reactor (upstream of the circulating pump).

Aspect 122. The system defined in any one of aspects 84-121, wherein a discharge line (or transfer line) from each loop reactor comprises a flashline heater.

Aspect 123. The system defined in aspect 122, wherein the system further comprises a catalyst deactivating agent inlet or reaction moderating agent inlet into the discharge line (or transfer line).

Aspect 124. The system defined in any one of aspects 84-123, wherein the separator comprises a flash chamber.

Aspect 125. The system defined in any one of aspects 84-124, wherein the separator comprises a cyclone.

Aspect 126. The system defined in any one of aspects 84-125, wherein each loop reactor comprises a reactor circulating pump (one or more than one).

Aspect 127. The system defined in any one of aspects 84-126, wherein the system further comprises a catalyst feed port configured to introduce the catalyst composition to the loop reactor (or the first loop reactor) in a slurry at a solids content of from 1 to 15 wt. %, from 2 to 14 wt. %, or from 3 to 12 wt. %.

Aspect 128. The system defined in any one of aspects 84-127, wherein each fluidized bed reactor is configured independently for any polymerization temperature, polymerization pressure, and fluidization velocity disclosed herein.

Aspect 129. The system defined in any one of aspects 84-128, wherein the system further comprises a condensable agent feed port configured to introduce a $C_3$-$C_8$ alkane or $C_4$-$C_8$ alkane condensable agent into each fluidized bed reactor.

Aspect 130. The system defined in any one of aspects 84-129, wherein each fluidized bed reactor is configured to discharge continuously (has a continuous take-off assembly).

Aspect 131. The system defined in any one of aspects 84-129, wherein each fluidized bed reactor is configured to discharge through a take-off assembly comprising a lock hopper.

Aspect 132. The system defined in any one of aspects 84-131, wherein the system further comprises a control system configured to control a bed height (or a level of solids) in each fluidized bed reactor.

Aspect 133. The system defined in any one of aspects 84-132, wherein the system further comprises a fines separator configured to separate fine polymer particles from unreacted olefins in a gas stream from the fluidized bed reactor, and conveying the fine polymer particles back to the fluidized bed reactor.

Aspect 134. The system defined in any one of aspects 84-133, wherein the system further comprising an analytical system configured to determine and/or control a polymer property of each ethylene polymer, using any suitable analytical technique, e.g., Raman spectroscopy for density, melt flow meter for MI and HLMI, a rheometer for rheological parameters, a GPC for MWD.

Aspect 135. The system defined in any one of aspects 84-134, wherein the system further comprises a deactivator inlet configured to inject a low level of deactivator downstream of the fluidized bed reactor to enhance properties (broaden MWD) and inhibit polymer growth.

We claim:

1. A polymerization reactor system for producing a multimodal ethylene polymer, the system comprising:
   (a) a loop reactor configured to contact a catalyst composition with ethylene, an optional first olefin comonomer, and hydrogen in an inert hydrocarbon diluent under slurry or supercritical polymerization conditions to produce a first ethylene polymer,
   wherein the loop reactor is further configured to maintain the slurry or supercritical polymerization conditions at a Cavitation number of from 6 to 60;
   (b) a discharge line configured to withdraw a first reactor effluent containing the first ethylene polymer from the loop reactor,
   wherein the discharge line comprises a flashline heater;
   (c) a separator configured to remove a light fraction comprising hydrogen from the first reactor effluent to form an intermediate material;
   (d) a fluidized bed reactor configured to contact the intermediate material with ethylene and an optional second olefin comonomer in an inert gas and/or hydrocarbon under gas phase polymerization conditions to produce the multimodal ethylene polymer; and
   (e) a recycle system configured to separate fine polymer particles from unreacted olefins in a gas stream exiting the fluidized bed reactor, and to convey the fine polymer particles back to the fluidized bed reactor.

2. The system of claim 1, wherein the recycle system comprises a cyclone and an eductor.

3. The system of claim 1, wherein the separator comprises a cyclone having a cone angle in a range from 60° to 85°.

4. The system of claim 1, wherein the Cavitation number is from 18 to 40.

5. The system of claim 1, wherein the system further comprises a polymer recovery system configured to receive a second reactor effluent containing the multimodal ethylene polymer from the fluidized bed reactor, to remove volatiles from the second reactor effluent, and to form a multimodal ethylene polymer fluff.

6. The system of claim 5, wherein the polymer recovery system comprises:
   a cyclone;
   a purge column; and
   a continuous fluff discharge between the cyclone and the purge column.

7. A process for producing a multimodal ethylene polymer, the process comprising:
   (i) contacting a catalyst composition with ethylene, an optional first olefin comonomer, and hydrogen in an inert hydrocarbon diluent in a loop reactor under slurry or supercritical polymerization conditions to produce a first ethylene polymer,
   wherein the catalyst composition is introduced into the loop reactor in a slurry at a solids content of from 1 to 15 wt. %, and
   wherein the slurry or supercritical polymerization conditions comprise a Cavitation number of from 6 to 60;
   (ii) continuously discharging a first reactor effluent containing the first ethylene polymer from the loop reactor into a discharge line comprising a flashline heater;
   (iii) separating a light fraction comprising hydrogen from the first reactor effluent to form an intermediate material; and
   (iv) contacting the intermediate material with ethylene and an optional second olefin comonomer in an inert gas and/or hydrocarbon in a fluidized bed reactor under gas phase polymerization conditions to produce the multimodal ethylene polymer.

8. The process of claim 7, wherein the catalyst composition is a Ziegler-Natta catalyst system.

9. The process of claim 8, wherein the Zeigler-Natta catalyst system comprises a supported catalyst having a titanium loading of from 0.1 to 20 wt. % and characterized by:
   a sphericity in a range from 0.5 to 1.0; and
   an average particle size of from 1 to 50 microns.

10. A polymerization reactor system for producing a multimodal ethylene polymer, the system comprising:
    (a) a loop reactor configured to contact a catalyst composition with ethylene, an optional first olefin comonomer, and hydrogen in an inert hydrocarbon diluent under slurry or supercritical polymerization conditions to produce a first ethylene polymer,
    wherein the loop reactor is further configured to maintain the slurry or supercritical polymerization conditions at a Biot number of less than or equal to 3;
    (b) a discharge line configured to withdraw a first reactor effluent containing the first ethylene polymer from the loop reactor;
    wherein the discharge line comprises a flashline heater;
    (c) a separator configured to remove a light fraction comprising hydrogen from the first reactor effluent to form an intermediate material;
    (d) a fluidized bed reactor configured to contact the intermediate material with ethylene and an optional second olefin comonomer in an inert gas and/or hydrocarbon under gas phase polymerization conditions to produce the multimodal ethylene polymer; and
    (e) a polymer recovery system configured to receive a second reactor effluent containing the multimodal ethylene polymer from the fluidized bed reactor, to remove volatiles from the second reactor effluent, and to form a multimodal ethylene polymer fluff.

11. The system of claim 10, wherein the system further comprises a recycle system configured to separate fine polymer particles from unreacted olefins in a gas stream exiting the fluidized bed reactor, and to convey the fine polymer particles back to the fluidized bed reactor.

12. The system of claim 11, wherein the recycle system comprises a cyclone and an eductor.

13. The system of claim 10, wherein the separator comprises a cyclone having a cone angle in a range from 60° to 85°.

14. The system of claim 10, wherein the Biot number is less than or equal to 1.5.

15. The system of claim 10, wherein the polymer recovery system comprises:
- a cyclone;
- a purge column; and
- a continuous fluff discharge between the cyclone and the purge column.

16. A process for producing a multimodal ethylene polymer, the process comprising:
- (i) contacting a catalyst composition with ethylene, an optional first olefin comonomer, and hydrogen in an inert hydrocarbon diluent in a loop reactor under slurry or supercritical polymerization conditions to produce a first ethylene polymer,
  wherein the catalyst composition is introduced into the loop reactor in a slurry at a solids content of from 1 to 15 wt. %, and
  wherein the slurry or supercritical polymerization conditions comprise a Biot number of less than or equal to 3;
- (ii) continuously discharging a first reactor effluent containing the first ethylene polymer from the loop reactor into a discharge line comprising a flashline heater;
- (iii) separating a light fraction comprising hydrogen from the first reactor effluent to form an intermediate material; and
- (iv) contacting the intermediate material with ethylene and an optional second olefin comonomer in an inert gas and/or hydrocarbon in a fluidized bed reactor under gas phase polymerization conditions to produce the multimodal ethylene polymer.

17. The process of claim 16, wherein the catalyst composition is a Ziegler-Natta catalyst system.

18. The process of claim 17, wherein the Zeigler-Natta catalyst system comprises a supported catalyst having a titanium loading of from 0.1 to 20 wt. %.

19. The process of claim 18, wherein the supported catalyst has an average particle size of from 1 to 50 microns.

20. The process of claim 16, wherein the slurry or supercritical polymerization conditions further comprise a Cavitation number of from 6 to 60.

21. The process of claim 20, wherein the Biot number is less than or equal to 1.5.

* * * * *